(12) United States Patent
Cheng et al.

(10) Patent No.: US 10,154,513 B2
(45) Date of Patent: Dec. 11, 2018

(54) TERMINAL SCHEDULING METHOD, STATION, AND TERMINAL

(71) Applicant: HUAWEI TECHNOLOGIES CO., LTD., Shenzhen (CN)

(72) Inventors: Hong Cheng, Shenzhen (CN); Sheng Liu, Shenzhen (CN); Teyan Chen, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 341 days.

(21) Appl. No.: 15/217,431

(22) Filed: Jul. 22, 2016

(65) Prior Publication Data

US 2016/0330758 A1 Nov. 10, 2016

Related U.S. Application Data

(63) Continuation of application No. PCT/CN2014/071280, filed on Jan. 23, 2014.

(51) Int. Cl.
*H04W 72/12* (2009.01)
*H04L 1/00* (2006.01)
(Continued)

(52) U.S. Cl.
CPC .......... *H04W 72/1273* (2013.01); *H04L 1/00* (2013.01); *H04L 5/0037* (2013.01);
(Continued)

(58) Field of Classification Search
None
See application file for complete search history.

(56) References Cited

U.S. PATENT DOCUMENTS

2007/0268848 A1 11/2007 Khandekar et al.
2013/0194984 A1 8/2013 Cheng et al.
(Continued)

FOREIGN PATENT DOCUMENTS

CN 101444016 A 5/2009
CN 101667960 3/2010
(Continued)

OTHER PUBLICATIONS

International Search Report dated Oct. 27, 2014 in corresponding International Patent Application No. PCT/CN2014/071280.
(Continued)

*Primary Examiner* — Kenny S Lin
(74) *Attorney, Agent, or Firm* — Staas & Halsey LLP

(57) ABSTRACT

Embodiments of the present invention relate to a terminal scheduling method, a station, and a terminal. The method includes: sending, by a first station, a first notification message to a first terminal that is also in a first service set, where the first notification message is used to instruct the first terminal to send a sounding signal; receiving, by the first station, mutual interference information sent by a second terminal, where the mutual interference information includes a signal parameter value used to represent that signal interference is generated between the second terminal and the first terminal and identifier information used to determine the first terminal that sends the sounding signal, and the mutual interference information is sent if the second terminal obtains the sounding signal by means of listening; and performing, by the first station, scheduling processing on the first terminal and the second terminal according to the signal parameter value and the identifier information.

34 Claims, 5 Drawing Sheets

(51) Int. Cl.
  *H04L 5/00*     (2006.01)
  *H04L 5/14*     (2006.01)
  *H04W 72/04*    (2009.01)

(52) U.S. Cl.
  CPC .......... *H04L 5/0048* (2013.01); *H04L 5/0066*
    (2013.01); *H04L 5/14* (2013.01); *H04W*
    *72/044* (2013.01); *H04W 72/1231* (2013.01)

(56) References Cited

U.S. PATENT DOCUMENTS

| | | | | | |
|---|---|---|---|---|---|
| 2013/0201941 | A1* | 8/2013 | Classon | ................ | H04L 5/0048 370/329 |
| 2013/0229989 | A1* | 9/2013 | Natarajan | ........... | H04W 72/042 370/329 |
| 2014/0148107 | A1* | 5/2014 | Maltsev | ................... | H04B 1/02 455/91 |
| 2015/0156794 | A1* | 6/2015 | Kwon | ............... | H04W 72/1231 370/329 |
| 2015/0188683 | A1* | 7/2015 | Zhang | .................. | H04L 1/0007 370/280 |
| 2015/0230286 | A1* | 8/2015 | Feuersaenger | .... | H04W 72/1215 370/252 |
| 2016/0044689 | A1* | 2/2016 | Wen | ..................... | H04J 11/0023 370/330 |
| 2016/0295526 | A1* | 10/2016 | Park | ..................... | H04W 52/325 |
| 2017/0347281 | A1* | 11/2017 | Liu | ....................... | H04L 5/0048 |

FOREIGN PATENT DOCUMENTS

| | | |
|---|---|---|
| CN | 101964750 | 2/2011 |
| CN | 102271407 | 12/2011 |
| CN | 102281639 | 12/2011 |
| CN | 103209415 A | 7/2013 |
| GB | 2448757 | 10/2008 |
| JP | 2013-236257 | 11/2013 |

OTHER PUBLICATIONS

Written Opinion of the International Search Authority dated Oct. 27, 2014 in corresponding International Patent Application No. PCT/CN2014/071280.

International Search Report dated Oct. 27, 2014 in corresponding International Application No. PCT/CN2014/071280.

* cited by examiner

TERMINAL SCHEDULING METHOD, STATION, AND TERMINAL

CROSS REFRENRENCE

This application is a continuation of International Application No. PCT/CN2014/071280, filed on Jan. 23, 2014 which is hereby incorporated by reference in its entirety.

TECHNICAL FIELD

The present invention relates to the field of communications technologies, and in particular, to a terminal scheduling method, a station, and a terminal.

BACKGROUND

With rapid development of communications systems, a communications system starts to gradually perform communication in a full-duplex manner, and communication efficiency and communication quality of the communications system can be improved by means of full-duplex communication. The so-called full-duplex communication refers to that a transceiver performs simultaneous transmission of uplink and downlink signals on a same time-frequency resource, and has spectral efficiency twice that of simplex communication and of half-duplex communication.

In the prior art, there is little discussion about a wireless full-duplex communications system that includes one central node and multiple terminal devices (that is, a one-to-many wireless full-duplex communications system) in the industry. Because the central node uses a full-duplex communication manner and the multiple terminal devices use a full-duplex/half-duplex communication manner to perform communication interaction, in a process of communication between the central node and the multiple terminal devices, mutual interference exists between the terminal devices. A main cause of generated mutual interference is that neighboring terminal devices use a same time-frequency resource to separately transmit and receive signals.

For example, in a scenario, a communication manner of the central node is a full-duplex communication manner, and a communication manner of the terminal devices is a half-duplex communication manner. To implement full duplex of a communications system, on a time-frequency resource, the central node schedules a first terminal device to send an uplink signal to the central node, and at the same time, the central node also sends a downlink signal to a second terminal device and schedules the second terminal device to receive the downlink signal. The first terminal device that sends the uplink signal generates interference to the nearby second terminal device that uses the same time-frequency resource to receive the downlink signal. In this case, the interference generated between the first terminal and the second terminal is mutual interference in the full-duplex communications system.

However, a processing solution for mutual interference that exists between different terminal devices in the one-to-many wireless full-duplex communications system is not involved in the prior art, and therefore, mutual interference between terminal devices still exists in a communications system, which reduces communication efficiency and communication quality of the communications system.

SUMMARY

Embodiments of the present invention provide a terminal scheduling method, a station, and a terminal, which resolve a problem in the prior art that mutual interference exists between different terminal devices.

According to a first aspect, an embodiment of the present invention provides a terminal scheduling method, where the method includes: sending, by a first station, a first notification message to a first terminal that is also in a first service set, where the first notification message is used to instruct the first terminal to send a sounding signal;

receiving, by the first station, mutual interference information sent by a second terminal, where the mutual interference information includes a signal parameter value used to represent that signal interference is generated between the second terminal and the first terminal and identifier information used to determine the first terminal that sends the sounding signal, and the mutual interference information is sent if the second terminal obtains the sounding signal by means of listening; and performing, by the first station, scheduling processing on the first terminal and the second terminal according to the signal parameter value and the identifier information.

According to a second aspect, an embodiment of the present invention provides a terminal scheduling method, where the method includes: receiving, by a first terminal, a first notification message sent by a station that is in a same service set, where the first notification message is used to instruct the first terminal to send a sounding signal; and sending, by the first terminal, the sounding signal according to the first notification message, so that if a second terminal obtains the sounding signal by means of listening and sends mutual interference information to the station, the station performs scheduling processing on the first terminal and the second terminal according to a signal parameter value and identifier information that are included in the mutual interference information, where the signal parameter value is used to represent that signal interference is generated between the second terminal and the first terminal, and the identifier information is used to determine the first terminal that sends the sounding signal.

According to a third aspect, an embodiment of the present invention provides a terminal scheduling method, where the method includes: listening to, by a first terminal, a sounding signal sent by a second terminal; and if the first terminal obtains the sounding signal by means of listening, sending, by the first terminal, mutual interference information to a first station, where the mutual interference information includes a signal parameter value used to represent that signal interference is generated between the first terminal and the second terminal and identifier information used to determine the second terminal that sends the sounding signal, so that the first station performs scheduling processing on the first terminal and the second terminal according to the signal parameter value and the identifier information.

According to a fourth aspect, an embodiment of the present invention provides a station, where the station is in a first service set, and the station includes:

a sending unit, configured to send a first notification message to a first terminal that is also in the first service set, where the first notification message is used to instruct the first terminal to send a sounding signal;

a receiving unit, configured to receive mutual interference information sent by a second terminal, where the mutual interference information includes a signal parameter value used to represent that signal interference is generated between the second terminal and the first terminal and identifier information used to determine the first terminal that sends the sounding signal, and the mutual interference information is sent if the second terminal obtains the sounding signal by means of listening; and a scheduling unit, configured to perform scheduling processing on the first terminal and the second terminal according to the signal parameter value and the identifier information.

According to a fifth aspect, an embodiment of the present invention provides a terminal, where the terminal includes: a receiving unit, configured to receive a first notification message sent by a station that is in a same service set, where the first notification message is used to instruct the terminal to send a sounding signal; and a sending unit, configured to send the sounding signal according to the first notification message, so that if another terminal obtains the sounding signal by means of listening and sends mutual interference information to the station, the station performs scheduling processing on the terminal and the another terminal according to a signal parameter value and identifier information that are included in the mutual interference information, where the signal parameter value is used to represent that signal interference is generated between the terminal and the another terminal, and the identifier information is used to determine the terminal that sends the sounding signal.

According to a sixth aspect, an embodiment of the present invention provides a terminal, where the terminal includes: a listening unit, configured to listen to a sounding signal sent by another terminal; and a sending unit, configured to: if the sounding signal is obtained by listening, send mutual interference information to a first station, where the mutual interference information includes a signal parameter value used to represent that signal interference is generated between the terminal and the another terminal and identifier information used to determine the another terminal that sends the sounding signal, so that the first station performs scheduling processing on the terminal and the another terminal according to the signal parameter value and the identifier information.

According to a seventh aspect, an embodiment of the present invention provides a station, where the station is in a first service set, and the station includes:
 a network interface;
 a processor; and
 a memory, where
the network interface is configured to perform interactive communication with a first terminal that is also in the first service set and a first station in a second service set, where the second service set is a service set neighboring to the first service set; and the memory is configured to store an application program, where the application program includes an instruction that can be used to enable the processor to perform the following processes:
 sending a first notification message to the first terminal, where the first notification message is used to instruct the first terminal to send a sounding signal;
 receiving mutual interference information sent by a second terminal, where the mutual interference information includes a signal parameter value used to represent that signal interference is generated between the second terminal and the first terminal and identifier information used to determine the first terminal that sends the sounding signal, and the mutual interference information is sent if the second terminal obtains the sounding signal by means of listening; and
 performing scheduling processing on the first terminal and the second terminal according to the signal parameter value and the identifier information.

According to an eighth aspect, an embodiment of the present invention provides a terminal, where the terminal includes: a network interface;
 a processor; and
 a memory, where
the network interface is configured to perform interactive communication with a station that is in a same service set; and the memory is configured to store an application program, where the application program includes an instruction that can be used to enable the processor to perform the following processes:
 receiving a first notification message sent by a station that is in a same service set, where the first notification message is used to instruct the terminal to send a sounding signal; and
 sending the sounding signal according to the first notification message, so that if another terminal obtains the sounding signal by means of listening and sends mutual interference information to the station, the station performs scheduling processing on the terminal and the another terminal according to a signal parameter value and identifier information that are included in the mutual interference information, where the signal parameter value is used to represent that signal interference is generated between the terminal and the another terminal, and the identifier information is used to determine the another terminal that sends the sounding signal.

According to a ninth aspect, an embodiment of the present invention provides a terminal, where the terminal includes: a network interface;
 a processor; and
 a memory, where
the network interface is configured to perform interactive communication with a first terminal that is also in a first service set and a first station in a second service set, where the second service set is a service set neighboring to the first service set; and the memory is configured to store an application program, where the application program includes an instruction that can be used to enable the processor to perform the following processes:
 listening to a sounding signal sent by another terminal; and
 if the terminal obtains the sounding signal by means of listening, sending mutual interference information to the first station, where the mutual interference information includes a signal parameter value used to represent that signal interference is generated between the terminal and the another terminal and identifier information used to determine the another terminal that sends the sounding signal, so that the first station performs scheduling processing on the terminal and the another terminal according to the signal parameter value and the identifier information.

Therefore, according to the terminal scheduling method, the station, and the terminal that are provided in the embodiments of the present invention, a first station instructs a first terminal in a same service set to send a sounding signal, and if a second terminal obtains the sounding signal by means of listening, the first station receives mutual interference information sent by the second terminal, and performs scheduling processing on the first terminal and the second terminal according to a signal parameter value and identifier information that are included in the mutual interference information, where the identifier information is used to determine the first terminal that sends the sounding signal, thereby avoiding a problem that mutual interference exists between terminal devices in an existing communications system, causing a reduction in communication efficiency and communication quality of the communications system. The embodiments of the present invention propose the solutions to the problem that mutual interference exists between terminal devices, so that impact of mutual interference between terminal devices that perform communication can be reduced, thereby improving communication efficiency and communication quality of a communications system.

DESCRIPTION OF EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

To provide thorough understanding of the present invention, the following further describes the embodiments of the present invention in detail with reference to the accompanying drawings. The foregoing embodiments are not intended to limit the protection scope of the present invention.

Embodiment 1

Figure 1:
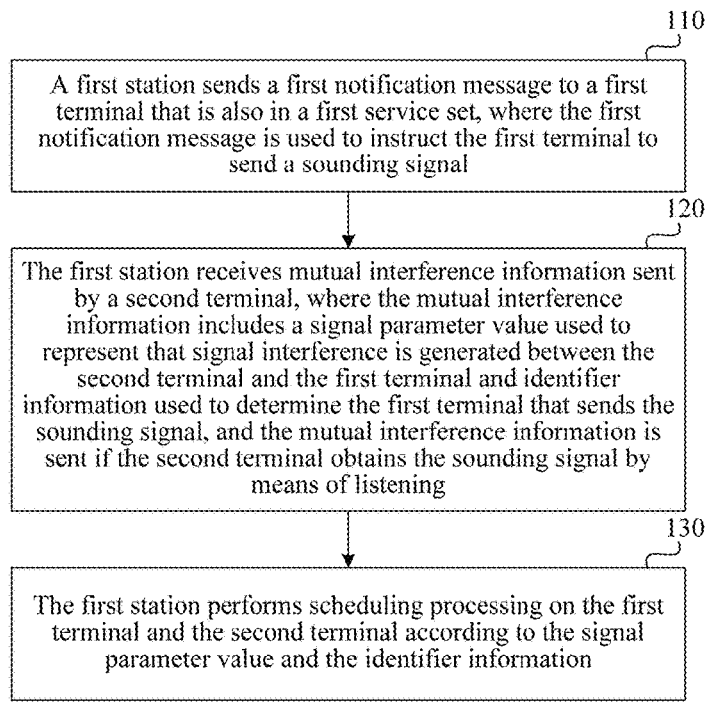
FIG. 1 is a flowchart of a terminal scheduling method according to an embodiment of the present invention.

A terminal scheduling method provided in Embodiment 1 of the present invention is described below in detail by using FIG. 1 as an example. FIG. 1 is a flowchart of a terminal scheduling method according to an embodiment of the present invention. In this embodiment of the present invention, the method is executed by a first station, where the first station may be a station in a service set. As shown in FIG. 1, this embodiment specifically includes the following steps:

Step 110: The first station sends a first notification message to a first terminal that is also in a first service set, where the first notification message is used to instruct the first terminal to send a sounding signal.

Specifically, the first service set includes the first station and multiple terminals, and the first station sends the first notification message to the first terminal, where the first notification message is used to instruct the first terminal to send the sounding signal.

Further, the first notification message includes identifier information of an in-band/out-of-band time-frequency resource block used to send the sounding signal, so that the first terminal sends the sounding signal on the in-band/out-of-band time-frequency resource block. The first terminal sends, according to the identifier information of the in-band/out-of-band time-frequency resource block, the sounding signal on the in-band/out-of-band time-frequency resource block specified by the first station.

Still further, if the first terminal sends the sounding signal on the out-of-band time-frequency resource block, the sounding signal further includes identifier information of a communications module in the first terminal, and the identifier information of the communications module may enable a second terminal, which obtains the sounding signal by means of listening, to determine the first terminal that sends the sounding signal. As an example rather than a limitation, the communications module is specifically a WiFi module, and the identifier information is specifically (MAC, MAC for short) address information of the WiFi module.

In this embodiment of the present invention, the sending, by a first station, a first notification message to a first terminal that is also in a first service set specifically includes: sending, by the first station, the first notification message to a specified first terminal in the first service set, to enable the specified first terminal to send the sounding signal, or sending, by the first station, the first notification message to a non-specified first terminal in the first service set, to enable the non-specified first terminal to send the sounding signal. Regardless of whether the first terminal is specified or non-specified, a location of the first terminal may be a central location, near the first station, in the first service set or an edge location, far away from the first station, in the first service set.

It may be understood that, the service set may be specifically coverage of communication network signals transmitted by a station. In this embodiment of the present invention, the terminal scheduling method may be applied to a wireless mobile communications system. If the wireless mobile communications system is specifically a wireless cellular network, the first station is specifically a base station, and the first terminal is specifically user equipment (User Equipment, UE for short). If the wireless mobile communications system is specifically a wireless local area network, the first station is specifically an access point (Access Point, AP for short), and the first terminal is specifically an access station (Station). The first station and the first terminal are described above in the form of an example, and are not limited in an actual application.

Step 120: The first station receives mutual interference information sent by a second terminal, where the mutual interference information includes a signal parameter value used to represent that signal interference is generated between the second terminal and the first terminal and identifier information used to determine the first terminal that sends the sounding signal, and the mutual interference information is sent if the second terminal obtains the sounding signal by means of listening.

Specifically, if the second terminal obtains, by means of listening, the sounding signal sent by the first terminal, the second terminal obtains a signal parameter value of signal interference generated between the second terminal and the first terminal, generates the mutual interference information, and sends the mutual interference information to the first station, where the mutual interference information includes the signal parameter value used to represent that signal interference is generated between the second terminal and the first terminal and the identifier information used to determine the first terminal that sends the sounding signal. The first station receives the mutual interference information sent by the second terminal.

It may be understood that, the second terminal performs detection and calculation on the sounding signal sent by the first terminal, so as to obtain the signal parameter value of signal interference generated between the second terminal and the first terminal.

The second terminal calculates a signal strength value of a corresponding video resource block used when the first terminal sends the sounding signal, and uses the signal strength value or an operation result of the signal strength value as the signal parameter value of signal interference generated between the second terminal and the first terminal. The operation result of the signal strength value specifically refers to an operation result obtained by averaging or quantizing the signal strength value.

In this embodiment of the present invention, the second terminal is specifically a terminal in the first service set; or the second terminal is specifically a terminal in a second service set, where the second terminal is managed by a second station in the second service set, and the second service set is a service set neighboring to the first service set.

It may be understood that, in this embodiment of the present invention, a quantity of second terminals and locations of the second terminals are not limited. As an example rather than a limitation, if a location of the first terminal is a central location of the first service set, the second terminal is also in the first service set; or if the first terminal is at an edge location in the first service set, the second terminal is at an edge location in the second service set.

Further, the identifier information used to determine the first terminal that sends the sounding signal specifically includes: If the first terminal sends the sounding signal on the in-band time-frequency resource block, the identifier information used to determine the first terminal that sends the sounding signal is specifically identifier information of the in-band time-frequency resource block; or if the first terminal sends the sounding signal on the out-of-band time-frequency resource block, the identifier information used to determine the first terminal that sends the sounding signal is specifically identifier information of a communications module in the first terminal.

In this embodiment of the present invention, the first terminal may send the sounding signal on the in-band/out-of-band time-frequency resource block. The receiving, by the first station, mutual interference information sent by a second terminal specifically includes:

In a first example, if the first terminal sends the sounding signal on the in-band time-frequency resource block, and the second terminal is in the first service set and obtains the sounding signal by means of listening, the first station receives the mutual interference information sent by the second terminal, where the mutual interference information includes the signal parameter value and the identifier information of the in-band time-frequency resource block.

In the foregoing first example, because the second terminal and the first terminal are both in the first service set, and the first terminal sends the sounding signal on the in-band time-frequency resource block, after obtaining the sounding signal by means of listening, the second terminal obtains the identifier information of the in-band time-frequency resource block, and determines, according to the identifier information of the in-band time-frequency resource block, the first terminal that sends the sounding signal on the in-band time-frequency resource block.

In a second example, if the first terminal sends the sounding signal on the out-of-band time-frequency resource block, and the second terminal is in the first service set and obtains the sounding signal by means of listening, the first station receives the mutual interference information sent by the second terminal, where the mutual interference information includes the signal parameter value and the identifier information of the communications module.

In the foregoing second example, because the second terminal and the first terminal are both in the first service set, and the first terminal sends the sounding signal on the out-of-band time-frequency resource block, after obtaining the sounding signal by means of listening, the second terminal obtains the identifier information, of the communications module in the first terminal, included in the sounding signal, and determines, according to the identifier information of the communications module, the first terminal that sends the sounding signal on the out-of-band time-frequency resource block.

In a third example, if the first terminal sends the sounding signal on the in-band/out-of-band time-frequency resource block, and the second terminal is in the second service set and obtains the sounding signal by means of listening, the first station receives the mutual interference information that is sent by the second terminal by using the second station, where the mutual interference information includes the signal parameter value, and the identifier information of the in-band time-frequency resource block/the identifier information of the communications module.

Further, in this embodiment of the present invention, if the second terminal obtains, by means of listening, the sounding signal sent by the first terminal, the second terminal further compares the obtained signal parameter value with a preset interference threshold.

In an implementation manner, if the second terminal obtains the sounding signal by means of listening, and the second terminal determines that the signal parameter value exceeds the preset interference threshold, the first station receives the mutual interference information sent by the second terminal; or if the second terminal obtains the sounding signal by means of listening, and the second terminal determines that the signal parameter value does not exceed an preset interference threshold, the second terminal does not send the mutual interference information to the first station, the first station does not receive, within a preset time, the mutual interference information sent by the second terminal, and the first station determines that no mutual interference exists between the second terminal and the first terminal or determines that mutual interference that exists between the second terminal and the first terminal is relatively small.

Alternatively, in another implementation manner, if the second terminal obtains the sounding signal by means of listening, and the second terminal determines that the signal parameter value does not exceed an preset interference threshold, the first station receives the mutual interference information sent by the second terminal; or if the second terminal obtains the sounding signal by means of listening, and the second terminal determines that the signal parameter value exceeds the preset interference threshold, the second terminal does not send the mutual interference information to the first station, the first station does not receive, within a preset time, the mutual interference information sent by the second terminal, and the first station determines that mutual interference exists between the second terminal and the first terminal.

As an example rather than a limitation, the signal parameter value is specifically a received signal strength (Received Signal Strength, RSS for short) value when the second terminal receives the sounding signal. The foregoing implementation manner is used as an example. If the RSS value exceeds the interference threshold, the second terminal determines that mutual interference exists between the second terminal and the first terminal, and the second terminal generates the mutual interference information and sends the mutual interference information to the first station, where the mutual interference information includes the RSS value and the identifier information that is used to determine the first terminal that sends the sounding signal. If the RSS value does not exceed an interference threshold, the second terminal determines that no mutual interference exists between the second terminal and the first terminal or mutual interference is relatively small, and the second terminal does not generate the mutual interference information.

Step 130: The first station performs scheduling processing on the first terminal and the second terminal according to the signal parameter value and the identifier information.

Specifically, the first station performs scheduling processing on the first terminal and the second terminal according to the received signal parameter value and the identifier information, to reduce mutual interference between the first terminal and the second terminal, so as to implement that full-duplex communication is performed between a station and a terminal, thereby improving communication efficiency and communication quality between the station and the terminal; in addition, a processing solution, which is absent in the prior art, for mutual interference that exists between terminal devices is also compensated for.

Further, the performing, by the first station, scheduling processing on the first terminal and the second terminal according to the signal parameter value and the identifier information specifically includes:

updating, by the first station, a terminal mutual interference list according to the signal parameter value and identifier information of an in-band time-frequency resource block/identifier information of a communications module, where the terminal mutual interference list is stored in the first station; and performing, by the first station, scheduling processing on the first terminal and the second terminal by using the terminal mutual interference list.

Therefore, according to the terminal scheduling method provided in this embodiment of the present invention, a first station instructs a first terminal in a same service set to send a sounding signal, and if a second terminal obtains the sounding signal by means of listening, the first station receives mutual interference information sent by the second terminal, and performs scheduling processing on the first terminal and the second terminal according to a signal parameter value and identifier information that are included in the mutual interference information, where the identifier information is used to determine the first terminal that sends the sounding signal, thereby avoiding a problem that mutual interference exists between terminal devices in an existing communications system, causing a reduction in communication efficiency and communication quality of the communications system. This embodiment of the present invention proposes the solution to the problem that mutual interference exists between terminal devices, so that impact of mutual interference between terminal devices that perform communication can be reduced, thereby improving communication efficiency and communication quality of a communications system.

Optionally, after step 110, this embodiment of the present invention further includes a step of specifying, by the first station, a second terminal that is to listen to the sounding signal. By means of the step, the second terminal may be enabled to listen to the sounding signal, and the second terminal sends mutual interference information to the first station, so that the first station uses the mutual interference information as a basis for scheduling a terminal. Specific steps are as follows:

if the second terminal is in the first service set, sending, by the first station, a listening message to the specified second terminal, where the listening message is used to instruct the second terminal to listen to the sounding signal; or if the second terminal is in the second service set, sending, by the first station, a second notification message to a second station in the second service set, where the second notification message is used by the second station to send a listening message to the specified second terminal, and the listening message is used to instruct the second terminal to listen to the sounding signal.

Specifically, it is already described above that the second terminal in this embodiment of the present invention is in the first service set or the second service set. If the second terminal is in the first service set, the first station sends the listening message to the specified second terminal, where the listening message is used to instruct the second terminal to listen to the sounding signal; or if the second terminal is in the second service set, the first station sends the second notification message to the second station in the second service set, where the second notification message is used by the second station to send the listening message to the specified second terminal, where the listening message is used to instruct the second terminal to listen to the sounding signal.

The specified second terminal may be preset by the first station/second station according to a distance between the second terminal and the first terminal.

Embodiment 2

For ease of real-time understanding of the present invention, further explanations and descriptions are provided below with reference to the accompanying drawings by using specific embodiments, and the embodiments do not constitute any limitation to the embodiments of the present invention.

A specific working process of performing, by the first station, scheduling processing on the first terminal and the second terminal by using a terminal mutual interference list in step 130 in the foregoing Embodiment 1 is described below in detail. In this embodiment of the present invention, an example in which the second terminal is in the first service set and sends the mutual interference information to the first station when the signal parameter value obtained by the second terminal exceeds the interference threshold is used to provide a detailed description.

In this embodiment of the present invention, the terminal mutual interference list is specifically shown in Table 1. It may be understood that the terminal mutual interference list is stored in a station in each service set, and the station performs update in real time according to mutual interference information sent by each terminal, and identifier information of each terminal is further stored at a corresponding terminal location in the table.

TABLE 1

| Terminal mutual interference list | | | | | |
|---|---|---|---|---|---|
| | Terminal 1 | Terminal 2 | Terminal 3 | Terminal 4 | Terminal 5 |
| Terminal 1 | | Y | N | Y | N |
| Terminal 2 | Y | | Y | N | N |
| Terminal 3 | N | Y | | | Y |
| Terminal 4 | Y | N | N | | Y |
| Terminal 5 | N | N | Y | Y | |

Figure 2:
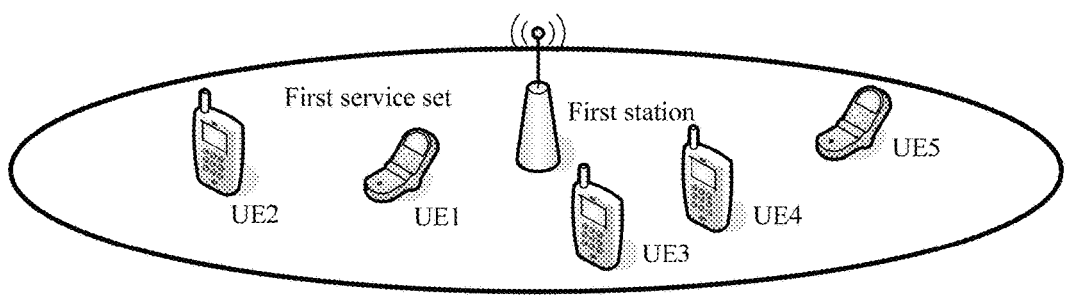
FIG. 2 is a schematic diagram of a terminal scheduling system according to an embodiment of the present invention.

As shown in FIG. 2, in this embodiment of the present invention, the first service set includes the first station, a terminal 1, a terminal 2, a terminal 3, a terminal 4, and a terminal 5. The terminal 1 is used as the first terminal, the terminal 2, the terminal 3, the terminal 4, or the terminal 5 may be used as the second terminal, and each of one or more second terminals is in the first service set.

According to the description of step 110 in the foregoing Embodiment 1, the terminal 1 sends the sounding signal. When the terminal 2, the terminal 3, the terminal 4, or the terminal 5 obtains the sounding signal by means of listening, a terminal (for example, the terminal 2) whose signal parameter value of signal interference generated between the terminal and the terminal 1 exceeds the interference threshold sends mutual interference information to the first station, and the first station updates the terminal mutual interference list according to the mutual interference information sent by the terminal 2.

For example, the signal parameter value sent by the terminal 2 exceeds the interference threshold, and the first station determines, according to identifier information included in the mutual interference information, that the terminal that sends the sounding signal is the terminal 1; therefore, the first station updates the first row in the column of the terminal 2 in Table 1 to "Y", to determine that mutual interference exists between the terminal 1 and the terminal 2. For another example, a signal parameter value obtained by the terminal 3 does not exceed an interference threshold, the terminal 3 does not send mutual interference information to the first station, and the first station does not receive, within a preset time, the mutual interference information sent by the terminal 3; therefore, the first station determines that no mutual interference exists between the terminal 3 and the terminal 1 or mutual interference that exists between the terminal 3 and the terminal 1 is relatively small; therefore, the first station updates the first row in the column of the terminal 3 in Table 1 to "N", to determine that no mutual interference exists between the terminal 1 and the terminal 3 or mutual interference that exists between the terminal 1 and the terminal 3 is relatively small.

After updating the terminal mutual interference list according to the mutual interference information sent by the second terminal, the first station performs scheduling processing on the first terminal and the second terminal by using the terminal mutual interference list.

The first station schedules either terminal of the first terminal and the second terminal to send an uplink/downlink signal on a first time-frequency resource block. If the first terminal (for example, the terminal 1) sends the uplink/downlink signal on the first time-frequency resource block, the first station obtains, from the terminal mutual interference list, identifier information of the second terminal (for example, the terminal 3) whose signal parameter value does not exceed an interference threshold; the first station sends a first scheduling message to the second terminal according to the identifier information of the second terminal, where the first scheduling message is used to instruct the second terminal to send a downlink/uplink signal on the first time-frequency resource block.

Alternatively, if the second terminal sends an uplink/downlink signal on a first time-frequency resource block, the first station obtains, from the terminal mutual interference list, identifier information of the first terminal whose signal parameter value does not exceed an interference threshold; the first station sends a first scheduling message to the first terminal according to the identifier information of the first terminal, where the first scheduling message is used to instruct the first terminal to send a downlink/uplink signal on the first time-frequency resource block.

The first time-frequency resource block is specifically an in-band/out-of-band time-frequency resource block.

For example, the first station first schedules the terminal 1 to send the uplink/downlink signal on the first time-frequency resource block. The first station obtains, from Table 1, the identifier information of the second terminal whose signal parameter value does not exceed an interference threshold, that is, the identifier information of the terminal (for example, the terminal 3) being "N" in the list. The first station sends the first scheduling message to the terminal 3, where the first scheduling message is used to instruct the terminal 3 to send a downlink/uplink signal on the first time-frequency resource block, so as to implement that the terminal 1 and the terminal 3 perform full-duplex paired transmission on a same time-frequency resource block.

Alternatively, the first station first schedules the terminal 3 to send the uplink/downlink signal on the first time-frequency resource block. The first station obtains, from Table 1, the identifier information of the first terminal whose signal parameter value does not exceed an interference threshold, that is, the identifier information of the terminal (for example, the terminal 1) being "N" in the list. The first station sends the first scheduling message to the terminal 1, where the first scheduling message is used to instruct the terminal 1 to send a downlink/uplink signal on the first time-frequency resource block, so as to implement that the terminal 1 and the terminal 3 perform full-duplex paired transmission on a same time-frequency resource block.

It may be understood that, according to the description of the foregoing Embodiment 1, there is still another implementation case, that is, when the signal parameter value obtained by the second terminal does not exceed an interference threshold, the mutual interference information is sent to the first station, so that the first station updates the terminal mutual interference list. The implementation process is similar to the foregoing, and is no longer described herein.

Embodiment 3

For ease of real-time understanding of the present invention, further explanations and descriptions are provided below with reference to the accompanying drawings by using specific embodiments, and the embodiments do not constitute any limitation to the embodiments of the present invention.

A specific working process of performing, by the first station, scheduling processing on the first terminal and the second terminal by using a terminal mutual interference list in step 130 in the foregoing Embodiment 1 is described below in detail. In this embodiment of the present invention, an example in which the second terminal is in the first service set and sends the mutual interference information to the first station when the signal parameter value obtained by the second terminal exceeds the interference threshold is used to provide a detailed description.

After updating the terminal mutual interference list according to the mutual interference information sent by the second terminal, the first station performs scheduling processing on the first terminal and the second terminal by using the terminal mutual interference list.

The first station schedules either terminal of the first terminal and the second terminal to send an uplink/downlink signal on a first time-frequency resource block. If the first terminal (for example, a terminal 1) sends the uplink/downlink signal on the first time-frequency resource block, the first station obtains, from the terminal mutual interference list, identifier information of the second terminal (for example, a terminal 2) whose signal parameter value exceeds the interference threshold; and the first station sends a second scheduling message to the second terminal according to the identifier information of the second terminal, where the second scheduling message includes identifier information of a second time-frequency resource block, and the second scheduling message is used to instruct the second terminal to send a downlink/uplink signal on the second time-frequency resource block.

Alternatively, if the second terminal sends an uplink/downlink signal on a first time-frequency resource block, the first station obtains, from the terminal mutual interference list, identifier information of the first terminal whose signal parameter value exceeds the interference threshold; and the first station sends a second scheduling message to the first terminal according to the identifier information of the first terminal, where the second scheduling message includes identifier information of a second time-frequency resource block, and the second scheduling message is used to instruct the first terminal to send a downlink/uplink signal on the second time-frequency resource block.

The first time-frequency resource block is specifically an in-band/out-of-band time-frequency resource block; and the second time-frequency resource block is specifically an in-band/out-of-band time-frequency resource block.

It should be noted that the second time-frequency resource block is also scheduled by the first station, and the second time-frequency resource block is different from the first time-frequency resource block. Additionally, the first station respectively schedules the first terminal and the second terminal to send the uplink/downlink signal on the first time-frequency resource block and the second time-frequency block, so that mutual interference between the terminals is reduced.

For example, the first station first schedules the terminal 1 to send the uplink/downlink signal on the first time-frequency resource block. The first station obtains, from Table 1, the identifier information of the second terminal whose signal parameter value exceeds the interference threshold, that is, the identifier information of the terminal (for example, the terminal 2) being "Y" in the list. The first station sends a second scheduling message to the terminal 2, where the second scheduling message includes the identifier information of the second time-frequency resource block, and is used to instruct the terminal 2 to send the downlink/uplink signal on the second time-frequency resource block, so as to implement that the terminal 1 and the terminal 2 perform full-duplex paired transmission on different time-frequency resource blocks.

Alternatively, the first station first fixes the terminal 2 to send the uplink/downlink signal on the first time-frequency resource block. The first station obtains, from Table 1, the identifier information of the first terminal whose signal parameter value exceeds the interference threshold, that is, the identifier information of the terminal (for example, the terminal 1) being "Y" in the list. The first station sends a second scheduling message to the terminal 1, where the second scheduling message includes the identifier information of the second time-frequency resource block, and is used to instruct the terminal 1 to send the downlink/uplink signal on the second time-frequency resource block, so as to implement that the terminal 1 and the terminal 2 perform full-duplex paired transmission on different in-band/out-of-band time-frequency resource blocks. For scheduling of two terminals to send a signal on different in-band/out-of-band time-frequency resource blocks, in consideration of an inter-carrier interference (Inter-carrier Interference, ICI for short) value caused by a spectral side lobe of a signal, an interval of corresponding time-frequency domains must meet that an ICI value is less than a preset carrier interference threshold.

It may be understood that, according to the description of the foregoing Embodiment 1, there is still another implementation case, that is, when the signal parameter value obtained by the second terminal does not exceed an interference threshold, the mutual interference information is sent to the first station, so that the first station updates the terminal mutual interference list. The implementation process is similar to the foregoing, and is no longer described herein.

Embodiment 4

For ease of real-time understanding of the present invention, further explanations and descriptions are provided below with reference to the accompanying drawings by using specific embodiments, and the embodiments do not constitute any limitation to the embodiments of the present invention.

A specific working process of performing, by the first station, scheduling processing on the first terminal and the second terminal by using a terminal mutual interference list in step 130 in the foregoing Embodiment 1 is described below in detail. In this embodiment of the present invention, an example in which the second terminal is in the first service set and sends the mutual interference information to the first station when the signal parameter value obtained by the second terminal exceeds the interference threshold is used to provide a detailed description.

After updating the terminal mutual interference list according to the mutual interference information sent by the second terminal, the first station performs scheduling processing on the first terminal and the second terminal by using the terminal mutual interference list.

The first station obtains, from the terminal mutual interference list, identifier information of the first terminal and the second terminal (for example, a terminal 1 and a terminal 3) whose signal parameter values both fail to exceed an interference threshold; and the first station respectively sends a third scheduling message to the first terminal and the second terminal according to the identifier information of the first terminal and the second terminal, where the third scheduling message includes identifier information of a first time-frequency resource block, and the third scheduling message is used to instruct the first terminal and the second terminal to respectively send an uplink/downlink signal on the first time-frequency resource block.

Alternatively, the first station obtains, from the terminal mutual interference list, identifier information of the first terminal and the second terminal (for example, a terminal 1 and a terminal 2) whose signal parameter values both exceed an interference threshold; and the first station respectively sends a fourth scheduling message to the first terminal and the second terminal according to the identifier information of the first terminal and the second terminal, and the fourth scheduling message includes identifier information of a first time-frequency resource block and a second time-frequency resource block, and the fourth scheduling message is used to instruct the first terminal and the second terminal to respectively send an uplink/downlink signal on the first time-frequency resource block and the second time-frequency resource block.

The first time-frequency resource block is specifically an in-band/out-of-band time-frequency resource block; and the second time-frequency resource block is specifically an in-band/out-of-band time-frequency resource block.

For example, the first station obtains, from Table 1, the identifier information of the second terminals whose signal parameter values both fail to exceed an interference threshold, that is, the identifier information of the two terminals (for example, the terminal 1 and the terminal 3) that are both "N" in the list. The first station respectively sends a third scheduling message to the terminal 1 and the terminal 3, where the third scheduling message includes the identifier information of the first time-frequency resource block, and is used to instruct the terminal 1 and the terminal 3 to send the uplink/downlink signal on the first time-frequency resource block, so as to implement that the terminal 1 and the terminal 3 perform full-duplex paired transmission on a same time-frequency resource block. Different from the scheduling process described in the foregoing Embodiment 2, the first station no longer fixes a terminal and then performs scheduling according to Table 1, and instead, the first station directly determines, from Table 1, a terminal that can perform full-duplex paired transmission.

Alternatively, the first station obtains, from Table 1, the identifier information of the second terminals whose signal parameter values both exceed an interference threshold, that is, the identifier information of the two terminals (for example, the terminal 1 and the terminal 2) that are both "Y" in the list. The first station respectively sends a fourth scheduling message to the terminal 1 and the terminal 2, where the fourth scheduling message includes the identifier information of the first time-frequency resource block and the second time-frequency resource block, and is used to instruct the terminal 1 and the terminal 2 to respectively send the uplink/downlink signal on the first time-frequency resource block and the second time-frequency resource block (for example, the terminal 1 sends the uplink/downlink signal on the first time-frequency resource block, and the terminal 2 sends the downlink/uplink signal on the second time-frequency resource block; or the terminal 1 sends the uplink/downlink signal on the second time-frequency resource block, and the terminal 2 sends the downlink/uplink signal on the first time-frequency resource block), so as to implement that the terminal 1 and the terminal 2 perform full-duplex paired transmission on different time-frequency resource blocks. Different from the scheduling process described in the foregoing Embodiment 3, the first station no longer fixes a terminal and then performs scheduling according to Table 1, and instead, the first station directly determines, from Table 1, a terminal that can perform full-duplex paired transmission. For scheduling of two terminals to send a signal on different in-band/out-of-band time-frequency resource blocks, in consideration of an inter-carrier interference value (Inter-carrier Interference, ICI for short) caused by a spectral side lobe of a signal, an interval of corresponding time-frequency domains must meet that an ICI value is less than a preset carrier interference threshold.

It may be understood that, according to the description of the foregoing Embodiment 1, there is still another implementation case, that is, when the signal parameter value obtained by the second terminal does not exceed an interference threshold, the mutual interference information is sent to the first station, so that the first station updates the terminal mutual interference list. The implementation process is similar to the foregoing, and is no longer described herein.

Embodiment 5

For ease of real-time understanding of the present invention, further explanations and descriptions are provided below with reference to the accompanying drawings by using specific embodiments, and the embodiments do not constitute any limitation to the embodiments of the present invention.

A specific working process of performing, by the first station, scheduling processing on the first terminal and the second terminal by using a terminal mutual interference list in step 130 in the foregoing Embodiment 1 is described below in detail. In this embodiment of the present invention, an example in which the second terminal is in the second service set and sends the mutual interference information to the first station when the signal parameter value obtained by the second terminal exceeds the interference threshold is used to provide a detailed description.

In this embodiment of the present invention, the terminal mutual interference list is specifically shown in Table 2. It may be understood that the terminal mutual interference list is stored in a station in each service set, and the station performs update in real time according to mutual interference information sent by each terminal, and identifier information of each terminal is further stored at a corresponding terminal location in the table.

TABLE 2

Terminal mutual interference list

| | Terminal 11 | Terminal 12 | Terminal 13 | Terminal 14 | Terminal 15 | Terminal 21 | Terminal 22 |
|---|---|---|---|---|---|---|---|
| Terminal 11 |   | Y | N | N | N | Y | N |
| Terminal 12 | Y |   | N | N | N | N | N |
| Terminal 13 | N | N |   | N | N | N | N |
| Terminal 14 | N | N | N |   | N | N | N |
| Terminal 15 | N | N | N | N |   | N | N |
| Terminal 21 | Y | N | N | N | N |   | N |
| Terminal 22 | N | N | N | N | N | N |   |

Figure 3:
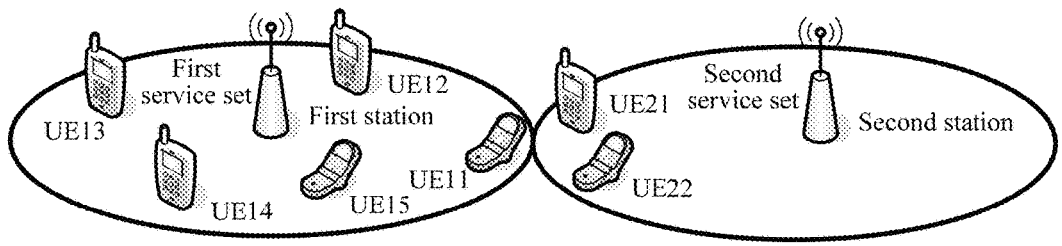
FIG. 3 is a schematic diagram of another terminal scheduling system according to an embodiment of the present invention.

As shown in FIG. 3, in this embodiment of the present invention, a first service set includes the first station, a terminal 11, a terminal 12, a terminal 13, a terminal 14, and a terminal 15, and each terminal is at an edge location of the first service set. The second service set includes a second station, a terminal 21, and a terminal 22, and the terminal 21 and the terminal 22 are at an edge location of the second service set. The terminal 11 is used as the first terminal, and the terminal 21 or the terminal 22 is used as the second terminal.

It may be understood that, the terminal 12, the terminal 13, the terminal 14, or the terminal 15 may also be used as the second terminal, which listens to a sounding signal sent by the terminal 11 and sends mutual interference information to the first station, and the first station updates a list and schedules a terminal according to the sent mutual interference information. A specific implementation process is described in the foregoing embodiment, and is no longer described herein.

According to the description of step 110 in the foregoing Embodiment 1, the terminal 11 sends the sounding signal. When the terminal 21 and terminal 22 obtain the sounding signal by means of listening, a terminal (for example, the terminal 21) whose signal parameter value of signal interference generated between the terminal and the terminal 11 exceeds the interference threshold sends mutual interference information to the first station by using the second station, and the first station updates the terminal mutual interference list according to the mutual interference information sent by the terminal 21.

For example, the signal parameter value sent by the terminal 21 exceeds the interference threshold, and the first station determines, according to identifier information included in the mutual interference information, that the terminal that sends the sounding signal is the terminal 1; therefore, the first station updates the first row in the column of the terminal 21 in Table 2 to "Y", to determine that mutual interference exists between the terminal 11 and the terminal 21. For another example, a signal parameter value obtained by the terminal 22 does not exceed an interference threshold, the terminal 22 does not send the mutual interference information to the first station, and the first station does not receive, within a preset time, the mutual interference information sent by the terminal 22; therefore, the first station determines that no mutual interference exists between the terminal 22 and the terminal 11 or mutual interference that exists between the terminal 22 and the terminal 11 is relatively small; therefore, the first station updates the first row in the column of the terminal 22 in Table 2 to "N", so as to determine that no mutual interference exists between the terminal 22 and the terminal 11 or mutual interference that exists between the terminal 22 and the terminal 11 is relatively small.

After updating the terminal mutual interference list according to the mutual interference information sent by the second terminal, the first station performs scheduling processing on the first terminal and the second terminal by using the terminal mutual interference list.

The first station obtains, from the terminal mutual interference list, identifier information of the first terminal and the second terminal (for example, the terminal 11 and the terminal 22) whose signal parameter values both fail to exceed an interference threshold. The first station sends a fifth scheduling message to the first terminal according to the identifier information of the first terminal, where the fifth scheduling message includes identifier information of a first time-frequency resource block, and the fifth scheduling instruction is used to instruct the first terminal to send an uplink/downlink signal on the first time-frequency resource block. The first station sends a third notification message to the second station, where the third notification message includes the identifier information of the second terminal and the identifier information of the first time-frequency resource block, and the third notification message is used by the second station to instruct the second terminal to send a downlink/uplink signal on the first time-frequency resource block.

The first time-frequency resource block is specifically an in-band/out-of-band time-frequency resource block.

For example, the first station obtains, from Table 2, the identifier information of the second terminals whose signal parameter values both fail to exceed an interference threshold, that is, the identifier information of two terminals that are both "N" (for example, the terminal 11 and the terminal 22) in the list. The first station sends a fifth scheduling message to the terminal 11, where the fifth scheduling message includes the identifier information of the first time-frequency resource block, and the fifth scheduling message is used to instruct the first terminal to send the uplink/downlink signal on the first time-frequency resource block. The first station further sends a third notification message to the second station, where the third notification message includes the identifier information of the terminal 22 and the identifier information of the first time-frequency resource block, and the third notification message is used by the second station to instruct the terminal 22 to send a downlink/uplink signal on the first time-frequency resource block, thereby implementing that the terminal 11 and the terminal 22 perform full-duplex paired transmission on a same time-frequency resource block.

It may be understood that, according to the description of the foregoing Embodiment 1, there is still another implementation case, that is, when the signal parameter value obtained by the second terminal does not exceed an interference threshold, the mutual interference information is sent to the first station, so that the first station updates the terminal mutual interference list. The implementation process is similar to the foregoing, and is no longer described herein.

Embodiment 6

For ease of real-time understanding of the present invention, further explanations and descriptions are provided below with reference to the accompanying drawings by using specific embodiments, and the embodiments do not constitute any limitation to the embodiments of the present invention.

A specific working process of performing, by the first station, scheduling processing on the first terminal and the second terminal by using a terminal mutual interference list in step 130 in the foregoing Embodiment 1 is described below in detail. In this embodiment of the present invention, an example in which the second terminal is in the second service set and sends the mutual interference information to the first station when the signal parameter value obtained by the second terminal exceeds the interference threshold is used to provide a detailed description.

After updating the terminal mutual interference list according to the mutual interference information sent by the second terminal, the first station performs scheduling processing on the first terminal and the second terminal by using the terminal mutual interference list.

If the second terminal is in the second service set, the first station obtains, from the terminal mutual interference list, identifier information of the first terminal and the second terminal (for example, a terminal 11 and a terminal 21) whose signal parameter values both exceed an interference threshold. The first station sends a sixth scheduling message to the first terminal according to the identifier information of the first terminal, where the sixth scheduling message includes identifier information of a first time-frequency resource block, and the sixth scheduling instruction is used to instruct the first terminal to send an uplink/downlink signal on the first time-frequency resource block. The first station sends a fourth notification message to a second station, where the fourth notification message includes the identifier information of the second terminal and identifier information of a second time-frequency resource block, and the fourth notification message is used by the second station to instruct the second terminal to send a downlink/uplink signal on the second time-frequency resource block. The first time-frequency resource block is specifically an in-band/out-of-band time-frequency resource block; and the second time-frequency resource block is specifically an in-band/out-of-band time-frequency resource block.

For example, the first station obtains, from Table 2, the identifier information of the second terminals whose signal parameter values both fail to exceed an interference threshold, that is, the identifier information of the two terminals (for example, the terminal 11 and the terminal 21) that are both "Y" in the list. The first station sends a sixth scheduling message to the terminal 11, where the sixth scheduling message includes the identifier information of the first time-frequency resource block, and the sixth scheduling message is used to instruct the first terminal to send the uplink/downlink signal on the first time-frequency resource block. The first station further sends a fourth notification message to the second station, where the fourth notification message includes the identifier information of the terminal 21 and the identifier information of the second time-frequency resource block, and the fourth notification message is used by the second station to instruct the terminal 21 to send the downlink/uplink signal on the second time-frequency resource block, so as to implement that the terminal 11 and the terminal 21 perform full-duplex paired transmission on different time-frequency resource blocks. For scheduling of two terminals to send a signal on different in-band/out-of-band time-frequency resource blocks, in consideration of an inter-carrier interference value (Inter-carrier Interference, ICI for short) caused by a spectral side lobe of a signal, an interval of corresponding time-frequency domains must meet that an ICI value is less than a preset carrier interference threshold.

Further, the terminal 11 sends the uplink/downlink signal on the first time-frequency resource block, and the terminal 21 sends the downlink/uplink signal on the second time-frequency resource block; or the terminal 11 sends the uplink/downlink signal on the second time-frequency resource block, and the terminal 21 sends the downlink/uplink signal on the first time-frequency resource block.

It may be understood that, according to the description of the foregoing Embodiment 1, there is still another implementation case, that is, when the signal parameter value obtained by the second terminal does not exceed an interference threshold, the mutual interference information is sent to the first station, so that the first station updates the terminal mutual interference list. The implementation process is similar to the foregoing, and is no longer described herein.

Embodiment 7

Figure 4:
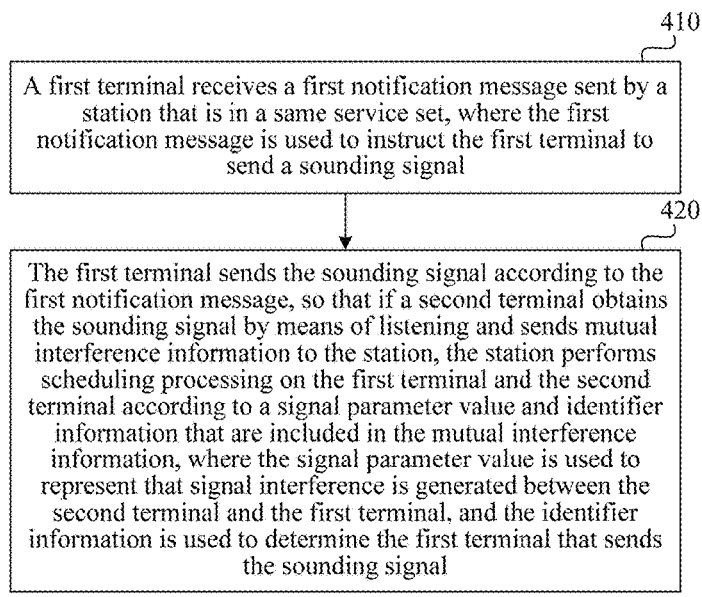
FIG. 4 is a flowchart of another terminal scheduling method according to an embodiment of the present invention.

A terminal scheduling method provided in Embodiment 7 of the present invention is described below in detail by using FIG. 4 as an example. FIG. 4 is a flowchart of another terminal scheduling method according to an embodiment of the present invention. In this embodiment of the present invention, the method is executed by a first terminal. As shown in FIG. 4, this embodiment specifically includes the following steps:

Step 410: The first terminal receives a first notification message sent by a station that is in a same service set, where the first notification message is used to instruct the first terminal to send a sounding signal.

Specifically, the service set includes a station and multiple first terminals, the first terminal receives the first notification message sent by the station, and the first notification message is used to instruct the first terminal to send the sounding signal.

Further, the first notification message includes identifier information of an in-band/out-of-band time-frequency resource block used to send the sounding signal, so that the first terminal sends the sounding signal on the in-band/out-of-band time-frequency resource block. The first terminal sends, according to the identifier information of the in-band/out-of-band time-frequency resource block, the sounding signal on the in-band/out-of-band time-frequency resource block specified by a first station.

Step 420: The first terminal sends the sounding signal according to the first notification message, so that if a second terminal obtains the sounding signal by means of listening and sends mutual interference information to the station, the station performs scheduling processing on the first terminal and the second terminal according to a signal parameter value and identifier information that are included in the mutual interference information, where the signal parameter value is used to represent that signal interference is generated between the second terminal and the first terminal, and the identifier information is used to determine the first terminal that sends the sounding signal.

Specifically, the first terminal sends the sounding signal on the in-band/out-of-band time-frequency resource block according to the first notification message, so that the second terminal obtains the sounding signal by means of listening, and sends the mutual interference information to the station. The station performs scheduling processing on the first terminal and the second terminal according to the signal parameter value and the identifier information that are included in the mutual interference information.

Optionally, after step 420, this embodiment of the present invention further includes: receiving a first scheduling message sent by the station, and sending, by the first terminal according to the first scheduling message, an uplink/downlink signal on the time-frequency resource block specified by the station. Specific steps are as follows:

receiving the first scheduling message sent by the station, where the first scheduling message includes identifier information of a first time-frequency resource block; and sending, by the first terminal, the uplink/downlink signal on the first time-frequency resource block; or receiving the first scheduling message sent by the station, where the first scheduling message includes identifier information of a second time-frequency resource block; and if the second terminal sends the uplink/downlink signal on the first time-frequency resource block, sending, by the first terminal, a downlink/uplink signal on the second time-frequency resource block.

That the first terminal and the second terminal send uplink/downlink signals on specified time-frequency resource blocks according to scheduling by a station is already described in detail in the foregoing embodiment, and is no longer described herein.

Therefore, according to the terminal scheduling method provided in this embodiment of the present invention, a first terminal sends a sounding signal according to a received first notification message, so that if a second terminal obtains the sounding signal by means of listening and sends mutual interference information to a station, the station performs scheduling processing on the first terminal and the second terminal according to a signal parameter value and identifier information that are included in the mutual interference information, where the identifier information is used to determine the first terminal that sends the sounding signal, thereby avoiding a problem that mutual interference exists between terminal devices in an existing communications system, causing a reduction in communication efficiency and communication quality of the communications system. This embodiment of the present invention proposes the solution to the problem that mutual interference exists between terminal devices, so that impact of mutual interference between terminal devices that perform communication can be reduced, thereby improving communication efficiency and communication quality of a communications system.

Embodiment 8

Figure 5:
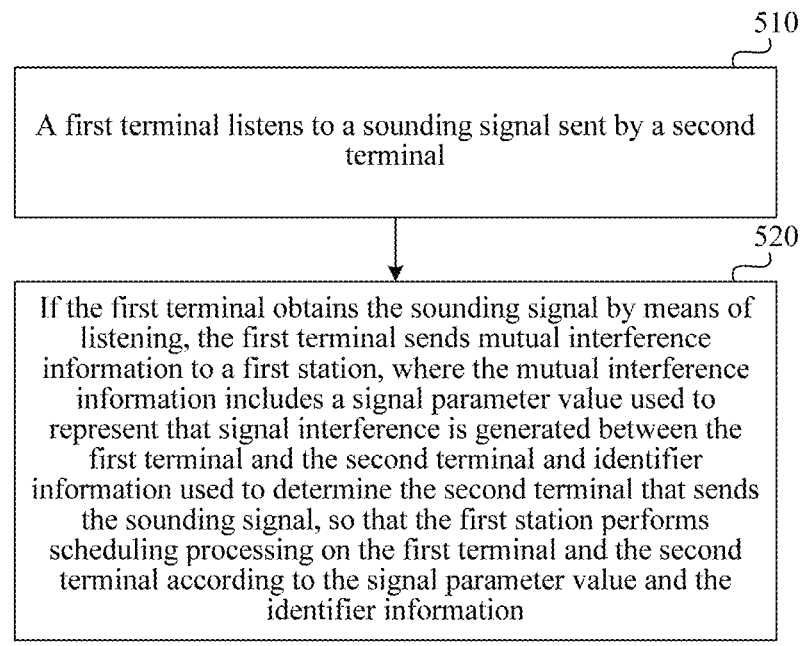
FIG. 5 is a flowchart of still another terminal scheduling method according to an embodiment of the present invention.

A terminal scheduling method provided in Embodiment 8 of the present invention is described below in detail by using FIG. 5 as an example. FIG. 5 is a flowchart of still another terminal scheduling method according to an embodiment of the present invention. In this embodiment of the present invention, the method is executed by a first terminal. As shown in FIG. 5, this embodiment specifically includes the following steps:

Step 510: The first terminal listens to a sounding signal sent by a second terminal.

Specifically, the second terminal sends the sounding signal on a specified time-frequency resource block, and the first terminal listens to the sounding signal sent by the second terminal.

Step 520: If the first terminal obtains the sounding signal by means of listening, the first terminal sends mutual interference information to a first station, where the mutual interference information includes a signal parameter value used to represent that signal interference is generated between the first terminal and the second terminal and identifier information used to determine the second terminal that sends the sounding signal, so that the first station performs scheduling processing on the first terminal and the second terminal according to the signal parameter value and the identifier information.

Specifically, if the first terminal obtains the sounding signal by means of listening, the first terminal sends the mutual interference information to the first station, where the mutual interference information includes the signal parameter value and the identifier information of the second terminal, and the first station performs scheduling processing on the first terminal and the second terminal according to the signal parameter value and the identifier information.

Further, the first terminal is specifically a terminal that is also in a first service set in which the second terminal and the first station are; or the first terminal is specifically a terminal in a second service set, where the second service set is a service set neighboring to the first service set.

Optionally, before step 510, this embodiment of the present invention further includes a step of receiving a listening message sent by a station, so as to listen to the sounding signal according to the listening message. Specific steps are as follows:

if the first terminal is in the first service set, receiving, by the first terminal, the listening message sent by the first station, where the listening message is used to instruct the first terminal to listen to the sounding signal; or if the first terminal is in the second service set, receiving, by the first terminal, the listening message sent by a second station, where the listening message is used to instruct the first terminal to listen to the sounding signal.

That the first terminal listens to the sounding signal is already described in detail in the foregoing embodiment, and is no longer described herein.

Optionally, after step 520, this embodiment of the present invention further includes: receiving, by the first terminal, a first scheduling message sent by the first station, and sending, by the first terminal according to the first scheduling message, an uplink/downlink signal on the time-frequency resource block specified by the station. Specific steps are as follows:

if the first terminal is in the first service set, receiving, by the first terminal, the first scheduling message sent by the first station, where the first scheduling message includes identifier information of a first time-frequency resource block; and sending, by the first terminal, the uplink/downlink signal on the first time-frequency resource block; or if the first terminal is in the first service set, receiving, by the first terminal, the first scheduling message sent by the first station, where the first scheduling message includes identifier information of a second time-frequency resource block;

if the second terminal sends the uplink/downlink signal on a first time-frequency resource block, sending, by the first terminal, a downlink/uplink signal on the second time-frequency resource block.

That the first terminal and the second terminal send uplink/downlink signals on specified time-frequency resource blocks according to scheduling by a station is already described in detail in the foregoing embodiment, and is no longer described herein.

Optionally, after step 520, this embodiment of the present invention further includes: receiving, by the first terminal, a first scheduling message sent by the second station, and sending, by the first terminal according to the first scheduling message, an uplink/downlink signal on the time-frequency resource block specified by the station. Specific steps are as follows:

if the first terminal is in the second service set, receiving, by the first terminal, first scheduling information sent by the second station, where the first scheduling information includes identifier information of a first video resource block; and sending, by the first terminal, the uplink/downlink signal on the first time-frequency resource block;

or if the first terminal is in the second service set, receiving, by the first terminal, the first scheduling message sent by the second station, where the first scheduling message includes identifier information of a second time-frequency resource block;

if the second terminal sends the uplink/downlink signal on a first time-frequency resource block, sending, by the first terminal, a downlink/uplink signal on the second time-frequency resource block.

That the first terminal and the second terminal send uplink/downlink signals on specified time-frequency resource blocks according to scheduling by a station is already described in detail in the foregoing embodiment, and is no longer described herein.

Therefore, according to the terminal scheduling method provided in this embodiment of the present invention, a first terminal listens to a sounding signal sent by a second terminal, if the first terminal obtains the sounding signal by means of listening, the first terminal sends mutual interference information to a first station, and the first station performs scheduling processing on the first terminal and the second terminal according to a signal parameter value and identifier information that are included in the mutual interference information, where the identifier information is used to determine the terminal that sends the sounding signal, thereby avoiding a problem that mutual interference exists between terminal devices in an existing communications system, causing a reduction in communication efficiency and communication quality of the communications system. This embodiment of the present invention proposes the solution to the problem that mutual interference exists between terminal devices, so that impact of mutual interference between terminal devices that perform communication can be reduced, thereby improving communication efficiency and communication quality of a communications system.

Embodiment 9

Figure 6:
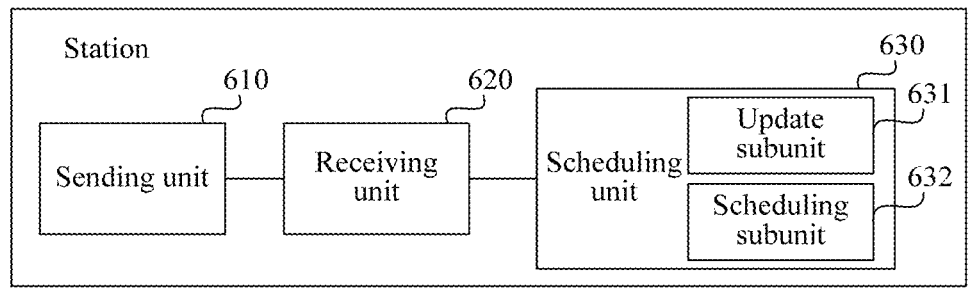
FIG. 6 is a schematic structural diagram of a station apparatus according to an embodiment of the present invention.

Correspondingly, this embodiment of the present invention further provides a station, and an implementation structure of the station is shown in FIG. 6. The station is configured to implement the terminal scheduling method in the foregoing embodiment of the present invention. The apparatus includes the following units: a sending unit 610, a receiving unit 620, and a scheduling unit 630.

The sending unit 610 is configured to send a first notification message to a first terminal that is also in a first service set, where the first notification message is used to instruct the first terminal to send a sounding signal.

The receiving unit 620 is configured to receive mutual interference information sent by a second terminal, where the mutual interference information includes a signal parameter value used to represent that signal interference is generated between the second terminal and the first terminal and identifier information used to determine the first terminal that sends the sounding signal, and the mutual interference information is sent if the second terminal obtains the sounding signal by means of listening.

The scheduling unit 630 is configured to perform scheduling processing on the first terminal and the second terminal according to the signal parameter value and the identifier information.

The first notification message sent by the sending unit 610 includes identifier information of an in-band/out-of-band time-frequency resource block used to send the sounding signal, so that the first terminal sends the sounding signal on the in-band/out-of-band time-frequency resource block.

The second terminal is specifically a terminal in the first service set; or the second terminal is specifically a terminal in a second service set, where the second service set is a service set neighboring to the first service set; and the sending unit 610 is further configured to: if the second terminal is in the first service set, send a listening message to the specified second terminal, where the listening message is used to instruct the second terminal to listen to the sounding signal; or if the second terminal is in the second service set, send a second notification message to a first station in the second service set, where the second notification message is used by the first station to send a listening message to the specified second terminal, and the listening message is used to instruct the second terminal to listen to the sounding signal.

If the first terminal sends the sounding signal on the out-of-band time-frequency resource block, the sounding signal includes identifier information of a communications module in the first terminal.

The receiving unit 620 is specifically configured to: if the first terminal sends the sounding signal on the in-band time-frequency resource block, and the second terminal is in the first service set and obtains the sounding signal by means of listening, receive the mutual interference information sent by the second terminal, where the mutual interference information includes the signal parameter value and the identifier information of the in-band time-frequency resource block; or if the first terminal sends the sounding signal on the out-of-band time-frequency resource block, and the second terminal is in the first service set and obtains the sounding signal by means of listening, receive the mutual interference information sent by the second terminal, where the mutual interference information includes the signal parameter value and the identifier information of the communications module; or if the first terminal sends the sounding signal on the in-band/out-of-band time-frequency resource block, and the second terminal is in the second service set and obtains the sounding signal by means of listening, receive the mutual interference information that is sent by the second terminal by using the first station in the second service set, where the mutual interference information includes the signal parameter value and the identifier information of the in-band time-frequency resource block/the identifier information of the communications module.

The scheduling unit 630 specifically includes: an update subunit 631, configured to update a terminal mutual interference list according to the signal parameter value and the identifier information of the in-band time-frequency resource block/the identifier information of the communications module; and a scheduling subunit 632, configured to perform scheduling processing on the first terminal and the second terminal by using the terminal mutual interference list.

The scheduling subunit 631 is specifically configured to: if the second terminal is in the first service set, schedule either terminal of the first terminal and the second terminal to send an uplink/downlink signal on a first time-frequency resource block;

if the first terminal sends the uplink/downlink signal on the first time-frequency resource block, obtain, from the terminal mutual interference list, identifier information of the second terminal whose signal parameter value does not exceed an interference threshold; and the sending unit 610 is further configured to send a first scheduling message to the second terminal according to the identifier information of the second terminal, where the first scheduling message is used to instruct the second terminal to send a downlink/uplink signal on the first time-frequency resource block;

or the scheduling subunit 631 is specifically configured to: if the second terminal sends the uplink/downlink signal on the first time-frequency resource block, obtain, from the terminal mutual interference list, identifier information of the first terminal whose signal parameter value does not exceed an interference threshold; and the sending unit 610 is further configured to send a first scheduling message to the first terminal according to the identifier information of the first terminal, where the first scheduling message is used to instruct the first terminal to send a downlink/uplink signal on the first time-frequency resource block.

The scheduling subunit 631 is specifically configured to: if the first terminal sends the uplink/downlink signal on the first time-frequency resource block, obtain, from the terminal mutual interference list, identifier information of the second terminal whose signal parameter value exceeds the interference threshold; and the sending unit 610 is further configured to send a second scheduling message to the second terminal according to the identifier information of the second terminal, where the second scheduling message includes identifier information of a second time-frequency resource block, and the second scheduling message is used to instruct the second terminal to send the downlink/uplink signal on the second time-frequency resource block;

or the scheduling subunit 631 is specifically configured to: if the second terminal sends the uplink/downlink signal on the first time-frequency resource block, obtain, from the terminal mutual interference list, identifier information of the first terminal whose signal parameter value exceeds the interference threshold; and the sending unit 610 is further configured to send a second scheduling message to the first terminal according to the identifier information of the first terminal, where the second scheduling message includes identifier information of a second time-frequency resource block, and the second scheduling message is used to instruct the first terminal to send the downlink/uplink signal on the second time-frequency resource block.

The scheduling subunit 631 is specifically configured to: if the second terminal is in the first service set, obtain, from the terminal mutual interference list, identifier information of the first terminal and the second terminal whose signal parameter values both fail to exceed an interference threshold; and the sending unit 610 is further configured to respectively send a third scheduling message to the first terminal and the second terminal according to the identifier information of the first terminal and the second terminal, where the third scheduling message includes identifier information of the first time-frequency resource block, and the third scheduling message is used to instruct the first terminal and the second terminal to respectively send the uplink/downlink signal on the first time-frequency resource block;

or the scheduling subunit 631 is specifically configured to: if the second terminal is in the first service set, obtain, from the terminal mutual interference list, identifier information of the first terminal and the second terminal whose signal parameter values both exceed an interference threshold; and the sending unit 610 is further configured to respectively send a fourth scheduling message to the first terminal and the second terminal according to the identifier information of the first terminal and the second terminal, where the fourth scheduling message includes identifier information of the first time-frequency resource block and the second time-frequency resource block, and the fourth scheduling message is used to instruct the first terminal and the second terminal to respectively send the uplink/downlink signal on the first time-frequency resource block and the second time-frequency resource block.

The scheduling subunit 631 is specifically configured to: if the second terminal is in the second service set, obtain, from the terminal mutual interference list, identifier information of the first terminal and the second terminal whose signal parameter values both fail to exceed an interference threshold;

the sending unit 610 is further configured to send a fifth scheduling message to the first terminal according to the identifier information of the first terminal, where the fifth scheduling message includes identifier information of the first time-frequency resource block, and the fifth scheduling instruction is used to instruct the first terminal to send the uplink/downlink signal on the first time-frequency resource block; and the sending unit 610 is further configured to send a third notification message to the first station in the second service set, where the third notification message includes the identifier information of the second terminal and the identifier information of the first time-frequency resource block, and the third notification message is used by the first station in the second service set to instruct the second terminal to send the downlink/uplink signal on the first time-frequency resource block.

The scheduling subunit 631 is specifically configured to: if the second terminal is in the second service set, obtain, from the terminal mutual interference list, the identifier information of the first terminal and the second terminal whose signal parameter values both exceed an interference threshold;

the sending unit 610 is further configured to send a sixth scheduling message to the first terminal according to the identifier information of the first terminal, where the sixth scheduling message includes the identifier information of the first time-frequency resource block, and the sixth scheduling instruction is used to instruct the first terminal to send the uplink/downlink signal on the first time-frequency resource block; and the sending unit 610 is further configured to send a fourth notification message to the second station, where the fourth notification message includes the identifier information of the second terminal and the identifier information of the second time-frequency resource block, and the fourth notification message is used by the first station in the second service set to instruct the second terminal to send a downlink/uplink signal on the second time-frequency resource block.

Therefore, according to the station provided in this embodiment of the present invention, the station instructs a first terminal in a same service set to send a sounding signal, and if a second terminal obtains the sounding signal by means of listening, the station receives mutual interference information sent by the second terminal, and performs scheduling processing on the first terminal and the second terminal according to a signal parameter value and identifier information that are included in the mutual interference information, where the identifier information is used to determine the first terminal that sends the sounding signal, thereby avoiding a problem that mutual interference exists between terminal devices in an existing communications system, causing a reduction in communication efficiency and communication quality of the communications system. This embodiment of the present invention proposes the solution to the problem that mutual interference exists between terminal devices, so that impact of mutual interference between terminal devices that perform communication can be reduced, thereby improving communication efficiency and communication quality of a communications system.

Embodiment 10

Figure 7:
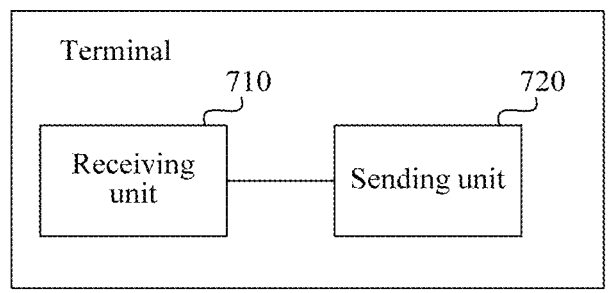
FIG. 7 is a schematic structural diagram of a terminal apparatus according to an embodiment of the present invention.

Correspondingly, this embodiment of the present invention further provides a terminal, and an implementation structure of the terminal is shown in FIG. 7. The terminal is configured to implement the terminal scheduling method in the foregoing embodiment of the present invention. The apparatus includes the following units: a receiving unit 710 and a sending unit 720.

The receiving unit 710 is configured to receive a first notification message sent by a station that is in a same service set, where the first notification message is used to instruct the terminal to send a sounding signal.

The sending unit 720 is configured to send the sounding signal according to the first notification message, so that if another terminal obtains the sounding signal by means of listening and sends mutual interference information to the station, the station performs scheduling processing on the terminal and the another terminal according to a signal parameter value and identifier information that are included in the mutual interference information, where the signal parameter value is used to represent that signal interference is generated between the terminal and the another terminal, and the identifier information is used to determine the terminal that sends the sounding signal.

The first notification message received by the receiving unit 710 includes identifier information of an in-band/out-of-band time-frequency resource block used to send the sounding signal, so that the terminal sends the sounding signal on the in-band/out-of-band time-frequency resource block.

The receiving unit 710 is further configured to receive a first scheduling message sent by the station, where the first scheduling message includes identifier information of a first time-frequency resource block.

The sending unit 720 is further configured to send an uplink/downlink signal on the first time-frequency resource block; or the receiving unit 710 is further configured to receive a first scheduling message sent by the station, where the first scheduling message includes identifier information of a second time-frequency resource block;

The sending unit 720 is further configured to: if the another terminal sends an uplink/downlink signal on the first time-frequency resource block, send a downlink/uplink signal on the second time-frequency resource block.

Therefore, according to the terminal provided in this embodiment of the present invention, the terminal sends a sounding signal according to a received first notification message, so that if another terminal obtains the sounding signal by means of listening and sends mutual interference information to a station, the station performs scheduling processing on the terminal and the another terminal according to a signal parameter value and identifier information that are included in the mutual interference information, where the identifier information is used to determine the terminal that sends the sounding signal, thereby avoiding a problem that mutual interference exists between terminal devices in an existing communications system, causing a reduction in communication efficiency and communication quality of the communications system. This embodiment of the present invention proposes the solution to the problem that mutual interference exists between terminal devices, so that impact of mutual interference between terminal devices that perform communication can be reduced, thereby improving communication efficiency and communication quality of a communications system.

Embodiment 11

Figure 8:
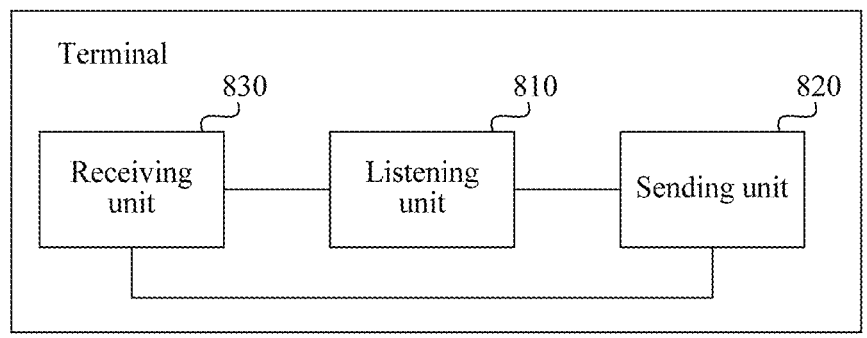
FIG. 8 is a schematic structural diagram of another terminal apparatus according to an embodiment of the present invention.

Correspondingly, this embodiment of the present invention further provides a terminal, and an implementation structure of the terminal is shown in FIG. 8. The terminal is configured to implement the terminal scheduling method in the foregoing embodiment of the present invention. The apparatus includes the following units: a listening unit 810 and a sending unit 820.

The listening unit 810 is configured to listen to a sounding signal sent by another terminal.

The sending unit 820 is configured to: when the sounding signal is obtained by means of listening, send mutual interference information to a first station, where the mutual interference information includes a signal parameter value used to represent that signal interference is generated between the terminal and the another terminal and identifier information used to determine the another terminal that sends the sounding signal, so that the first station performs scheduling processing on the terminal and the another terminal according to the signal parameter value and the identifier information.

The terminal is specifically a terminal that is also in a first service set in which the another terminal and the first station are; or the terminal is specifically a terminal that is in a second service set, where the second service set is a service set neighboring to the first service set.

The terminal further includes: a receiving unit 830, configured to: if the terminal is in the first service set, receive a listening message sent by the first station, where the listening message is used to instruct the terminal to listen to the sounding signal; or the receiving unit 830 is configured to: if the terminal is in the second service set, receive a listening message sent by a second station, where the listening message is used to instruct the terminal to listen to the sounding signal.

The receiving unit 830 is further configured to: if the terminal is in the first service set, receive a first scheduling message sent by the first station, where the first scheduling message includes identifier information of a first time-frequency resource block; and the sending unit 820 is further configured to send an uplink/downlink signal on the first time-frequency resource block; or the receiving unit 830 is further configured to: if the terminal is in the first service set, receive a first scheduling message sent by the first station, where the first scheduling message includes identifier information of a second time-frequency resource block; and the sending unit 820 is further configured to: if the another terminal sends an uplink/downlink signal on the first time-frequency resource block, send a downlink/uplink signal on the second time-frequency resource block.

The receiving unit 830 is further configured to: if the terminal is in the second service set, receive first scheduling information sent by the second station, where the first scheduling information includes identifier information of a first video resource block; and the sending unit 820 is further configured to send an uplink/downlink signal on the first time-frequency resource block; or the receiving unit 830 is further configured to: if the terminal is in the second service set, receive a first scheduling message sent by the second station, where the first scheduling message includes identifier information of a second time-frequency resource block; and the sending unit 820 is further configured to: if the another terminal sends an uplink/downlink signal on the first time-frequency resource block, send a downlink/uplink signal on the second time-frequency resource block.

Therefore, according to the terminal provided in this embodiment of the present invention, the terminal listens to a sounding signal sent by another terminal, if the terminal obtains the sounding signal by means of listening, the terminal sends mutual interference information to a first station, and the first station performs scheduling processing on the terminal and the another terminal according to a signal parameter value and identifier information that are included in the mutual interference information, where the identifier information is used to determine the terminal that sends the sounding signal, thereby avoiding a problem that mutual interference exists between terminal devices in an existing communications system, causing a reduction in communication efficiency and communication quality of the communications system. This embodiment of the present invention proposes the solution to the problem that mutual interference exists between terminal devices, so that impact of mutual interference between terminal devices that perform communication can be reduced, thereby improving communication efficiency and communication quality of a communications system.

Embodiment 12

Figure 9:
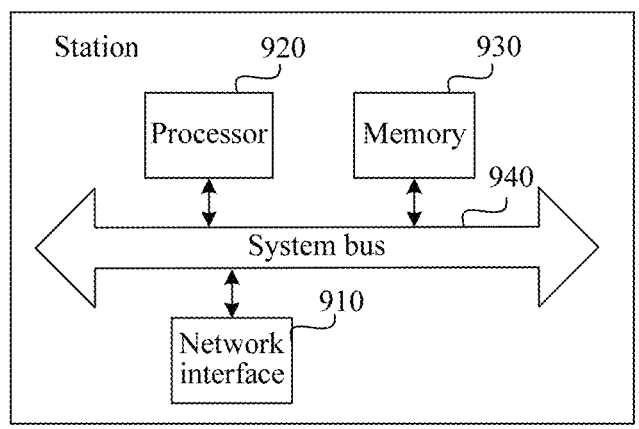
FIG. 9 is a schematic structural diagram of hardware of a station apparatus according to an embodiment of the present invention.

Correspondingly, this embodiment of the present invention further provides a station. This station is configured to implement the terminal scheduling method in the foregoing embodiment. As shown in FIG. 9, the station includes: a network interface 910, a processor 920, and a memory 930. A system bus 940 is configured to connect the network interface 910, the processor 920, and the memory 930.

The network interface 910 is configured to perform interactive communication with a first terminal that is also in a first service set and a first station in a second service set, where the second service set is a service set neighboring to the first service set.

The memory 930 may be a permanent memory, such as a hard disk drive or a flash memory. The memory 930 is configured to store an application program, where the application program includes an instruction that can be used to enable the processor 920 to perform the following processes:

sending a first notification message to the first terminal, where the first notification message is used to instruct the first terminal to send a sounding signal;

receiving mutual interference information sent by a second terminal, where the mutual interference information includes a signal parameter value used to represent that signal interference is generated between the second terminal and the first terminal and identifier information used to determine the first terminal that sends the sounding signal, and the mutual interference information is sent if the second terminal obtains the sounding signal by means of listening; and performing scheduling processing on the first terminal and the second terminal according to the signal parameter value and the identifier information.

Further, the first notification message sent by the network interface includes identifier information of an in-band/out-of-band time-frequency resource block used to send the sounding signal, so that the first terminal sends the sounding signal on the in-band/out-of-band time-frequency resource block.

Further, the second terminal is specifically a terminal in the first service set; or the second terminal is specifically a terminal in the second service set, and the second service set is a service set neighboring to the first service set.

Further, the application program stored in the memory 930 further includes an instruction that can be used to enable the processor 920 to perform the following processes:

if the second terminal is in the first service set, sending a listening message to the specified second terminal, where the listening message is used to instruct the second terminal to listen to the sounding signal; or if the second terminal is in the second service set, sending a second notification message to the first station in the second service set, where the second notification message is used by the first station in the second service set to send a listening message to the specified second terminal, and the listening message is used to instruct the second terminal to listen to the sounding signal.

Further, if the first terminal sends the sounding signal on the out-of-band time-frequency resource block, the sounding signal includes identifier information of a communications module in the first terminal.

Further, the instruction that is of the application program stored in the memory 930 and that can be used to enable the processor to perform the process of receiving the mutual interference information sent by the second terminal, where the mutual interference information includes a signal parameter value used to represent that signal interference is generated between the second terminal and the first terminal and the identifier information used to determine the first terminal that sends the sounding signal is specifically an instruction for performing the following process:

if the first terminal sends the sounding signal on the in-band time-frequency resource block, and the second terminal is in the first service set and obtains the sounding signal by means of listening, receiving the mutual interference information sent by the second terminal, where the mutual interference information includes the signal parameter value and the identifier information of the in-band time-frequency resource block; or if the first terminal sends the sounding signal on the out-of-band time-frequency resource block, and the second terminal is in the first service set and obtains the sounding signal by means of listening, receiving the mutual interference information sent by the second terminal, where the mutual interference information includes the signal parameter value and the identifier information of the communications module; or if the first terminal sends the sounding signal on the in-band/out-of-band time-frequency resource block, and the second terminal is in the second service set and obtains the sounding signal by means of listening, receiving the mutual interference information that is sent by the second terminal by using the second station, where the mutual interference information includes the signal parameter value and the identifier information of the in-band time-frequency resource block/the identifier information of the communications module.

Further, the instruction that is of the application program stored in the memory 930 and that can be used to enable the processor to perform the process of performing scheduling processing on the first terminal and the second terminal according to the signal parameter value and the identifier information is specifically an instruction for performing the following processes:

updating a terminal mutual interference list according to the signal parameter value and the identifier information of the in-band time-frequency resource block/the identifier information of the communications module; and performing scheduling processing on the first terminal and the second terminal by using the terminal mutual interference list.

Further, the instruction that is of the application program stored in the memory 930 and that can be used to enable the processor to perform the process of performing scheduling processing on the first terminal and the second terminal by using the terminal mutual interference list is specifically an instruction for performing the following processes:

if the second terminal is in the first service set, scheduling either terminal of the first terminal and the second terminal to send an uplink/downlink signal on a first time-frequency resource block;

if the first terminal sends the uplink/downlink signal on the first time-frequency resource block, obtaining, from the terminal mutual interference list, identifier information of the second terminal whose signal parameter value does not exceed an interference threshold; and sending a first scheduling message to the second terminal according to the identifier information of the second terminal, where the first scheduling message is used to instruct the second terminal to send a downlink/uplink signal on the first time-frequency resource block; or if the second terminal sends the uplink/downlink signal on the first time-frequency resource block, obtaining, from the terminal mutual interference list, the identifier information of the first terminal whose signal parameter value does not exceed an interference threshold; and sending a first scheduling message to the first terminal according to the identifier information of the first terminal, where the first scheduling message is used to instruct the first terminal to send a downlink/uplink signal on the first time-frequency resource block.

Further, the instruction that is of the application program stored in the memory 930 and that can be used to enable the processor to perform the process of performing scheduling processing on the first terminal and the second terminal by using the terminal mutual interference list is specifically an instruction for performing the following processes:

if the second terminal is in the first service set, scheduling, by the first station, either terminal of the first terminal and the second terminal to send the uplink/downlink signal on the first time-frequency resource block;

if the first terminal sends the uplink/downlink signal on the first time-frequency resource block, obtaining, by the first station from the terminal mutual interference list, the identifier information of the second terminal whose signal parameter value exceeds the interference threshold; and sending a second scheduling message to the second terminal according to the identifier information of the second terminal, where the second scheduling message includes identifier information of a second time-frequency resource block, and the second scheduling message is used to instruct the second terminal to send a downlink/uplink signal on the second time-frequency resource block; or if the second terminal sends the uplink/downlink signal on the first time-frequency resource block, obtaining, from the terminal mutual interference list, the identifier information of the first terminal whose signal parameter value exceeds the interference threshold; and sending, by the first station, a second scheduling message to the first terminal according to the identifier information of the first terminal, where the second scheduling message includes identifier information of a second time-frequency resource block, and the second scheduling message is used to instruct the first terminal to send a downlink/uplink signal on the second time-frequency resource block.

Further, the instruction that is of the application program stored in the memory 930 and that can be used to enable the processor to perform the process of performing scheduling processing on the first terminal and the second terminal by using the terminal mutual interference list is specifically an instruction for performing the following processes:

if the second terminal is in the first service set, obtaining, from the terminal mutual interference list, identifier information of the first terminal and the second terminal whose signal parameter values both fail to exceed an interference threshold; and respectively sending a third scheduling message to the first terminal and the second terminal according to the identifier information of the first terminal and the second terminal, where the third scheduling message includes identifier information of the first time-frequency resource block, and the third scheduling message is used to instruct the first terminal and the second terminal to respectively send the uplink/downlink signal on the first time-frequency resource block;

or if the second terminal is in the first service set, obtaining, from the terminal mutual interference list, identifier information of the first terminal and the second terminal whose signal parameter values both exceed an interference threshold; and respectively sending a fourth scheduling message to the first terminal and the second terminal according to the identifier information of the first terminal and the second terminal, where the fourth scheduling message includes identifier information of the first time-frequency resource block and the second time-frequency resource block, and the fourth scheduling message is used to instruct the first terminal and the second terminal to respectively send the uplink/downlink signal on the first time-frequency resource block and the second time-frequency resource block.

Further, the instruction that is of the application program stored in the memory 930 and that can be used to enable the processor to perform the process of performing scheduling processing on the first terminal and the second terminal by using the terminal mutual interference list is specifically an instruction for performing the following processes:

if the second terminal is in the second service set, obtaining, from the terminal mutual interference list, identifier information of the first terminal and the second terminal whose signal parameter values both fail to exceed an interference threshold;

sending a fifth scheduling message to the first terminal according to the identifier information of the first terminal, where the fifth scheduling message includes the identifier information of the first time-frequency resource block, and the fifth scheduling instruction is used to instruct the first terminal to send the uplink/downlink signal on the first time-frequency resource block; and sending a third notification message to the first station in the second service set, where the third notification message includes the identifier information of the second terminal and the identifier information of the first time-frequency resource block, and the third notification message is used by the first station in the second service set to instruct the second terminal to send the downlink/uplink signal on the first time-frequency resource block.

Further, the instruction that is of the application program stored in the memory 930 and that can be used to enable the processor to perform the process of performing scheduling processing on the first terminal and the second terminal by using the terminal mutual interference list is specifically an instruction for performing the following processes:

if the second terminal is in the second service set, obtaining, from the terminal mutual interference list, the identifier information of the first terminal and the second terminal whose signal parameter values both exceed an interference threshold;

sending a sixth scheduling message to the first terminal according to the identifier information of the first terminal, where the sixth scheduling message includes the identifier information of the first time-frequency resource block, and the sixth scheduling instruction is used to instruct the first terminal to send the uplink/downlink signal on the first time-frequency resource block; and sending a fourth notification message to the first station in the second service set, where the fourth notification message includes the identifier information of the second terminal and the identifier information of the second time-frequency resource block, and the fourth notification message is used by the first station in the second service set to instruct the second terminal to send the downlink/uplink signal on the second time-frequency resource block.

Therefore, according to the station provided in this embodiment of the present invention, the station instructs a first terminal that is in a same service set to send a sounding signal, and if a second terminal obtains the sounding signal by means of listening, the station receives mutual interference information sent by the second terminal, and performs scheduling processing on the first terminal and the second terminal according to a signal parameter value and identifier information that are included in the mutual interference information, where the identifier information is used to determine the first terminal that sends the sounding signal, thereby avoiding a problem that mutual interference exists between terminal devices in an existing communications system, causing a reduction in communication efficiency and communication quality of the communications system. This embodiment of the present invention proposes the solution to the problem that mutual interference exists between terminal devices, so that impact of mutual interference between terminal devices that perform communication can be reduced, thereby improving communication efficiency and communication quality of a communications system.

Embodiment 13

Figure 10:
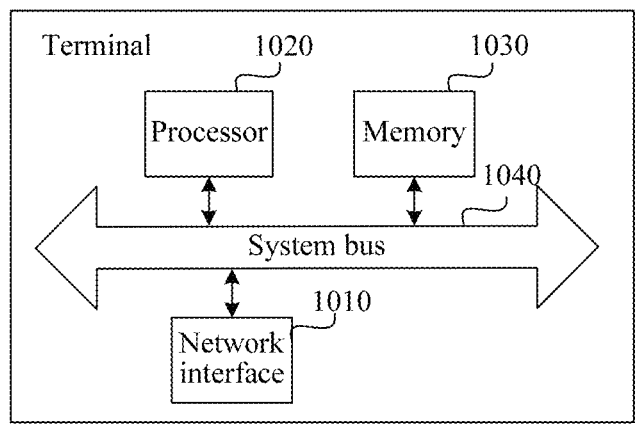
FIG. 10 is a schematic structural diagram of hardware of a terminal apparatus according to an embodiment of the present invention.

Correspondingly, this embodiment of the present invention further provides a terminal. The terminal is configured to implement the terminal scheduling method in the foregoing embodiment. As shown in FIG. 10, the terminal includes: a network interface 1010, a processor 1020, and a memory 1030. A system bus 1040 is configured to connect the network interface 1010, the processor 1020, and the memory 1030.

The network interface 1010 is configured to perform interactive communication with a station that is in a same service set.

The memory 1030 may be a permanent memory, such as a hard disk drive or a flash memory. The memory 1030 is configured to store an application program, where the application program includes an instruction that can be used to enable the processor 1020 to perform the following processes:

receiving a first notification message sent by a station that is in a same service set, where the first notification message is used to instruct the terminal to send a sounding signal; and sending the sounding signal according to the first notification message, so that if another terminal obtains the sounding signal by means of listening and sends mutual interference information to the station, the station performs scheduling processing on the terminal and the another terminal according to a signal parameter value and identifier information that are included in the mutual interference information, where the signal parameter value is used to represent that signal interference is generated between the terminal and the another terminal, and the identifier information is used to determine the another terminal that sends the sounding signal.

Further, the first notification message includes identifier information of an in-band/out-of-band time-frequency resource block used to send the sounding signal, so that the terminal sends the sounding signal on the in-band/out-of-band time-frequency resource block.

The application program stored in the memory 1030 further includes an instruction that can be used to enable the processor 1020 to perform the following processes:

receiving a first scheduling message sent by the station, where the first scheduling message includes identifier information of a first time-frequency resource block; and sending an uplink/downlink signal on the first time-frequency resource block; or receiving a first scheduling message sent by the station, where the first scheduling message includes identifier information of a second time-frequency resource block; and if the another terminal sends an uplink/downlink signal on a first time-frequency resource block, sending a downlink/uplink signal on the second time-frequency resource block.

Therefore, according to the terminal provided in this embodiment of the present invention, the terminal sends a sounding signal according to a received first notification message, so that if another terminal obtains the sounding signal by means of listening and sends mutual interference information to a station, the station performs scheduling processing on the terminal and the another terminal according to a signal parameter value and identifier information that are included in the mutual interference information, where the identifier information is used to determine the terminal that sends the sounding signal, thereby avoiding a problem that mutual interference exists between terminal devices in an existing communications system, causing a reduction in communication efficiency and communication quality of the communications system. This embodiment of the present invention proposes the solution to the problem that mutual interference exists between terminal devices, so that impact of mutual interference between terminal devices that perform communication can be reduced, thereby improving communication efficiency and communication quality of a communications system.

Embodiment 14

Figure 11:
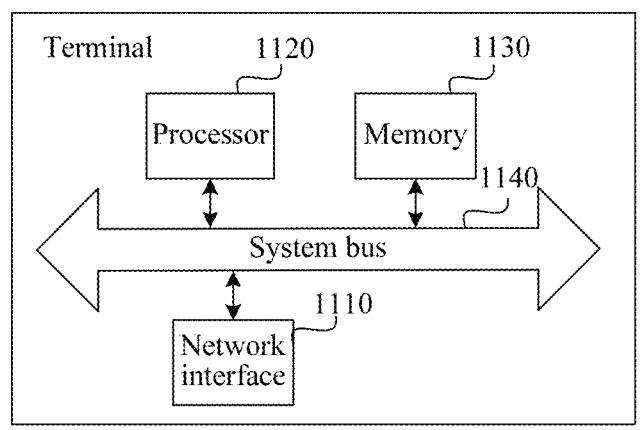
FIG. 11 is a schematic structural diagram of hardware of another terminal apparatus according to an embodiment of the present invention.

Correspondingly, this embodiment of the present invention further provides a terminal. The terminal is configured to implement the terminal scheduling method in the foregoing embodiment. As shown in FIG. 11, the terminal includes: a network interface 1110, a processor 1120, and a memory 1130. A system bus 1140 is configured to connect the network interface 1110, the processor 1120, and the memory 1130.

The network interface 1110 is configured to perform interactive communication with a first terminal that is also in a first service set and a first station in a second service set, where the second service set is a service set neighboring to the first service set.

The memory 1130 may be a permanent memory, such as a hard disk drive or a flash memory. The memory 1130 is configured to store an application program, where the application program includes an instruction that can be used to enable the processor 1120 to and perform the following processes:

listening to a sounding signal sent by another terminal; and if the terminal obtains the sounding signal by means of listening, sending mutual interference information to the first station, where the mutual interference information includes a signal parameter value used to represent that signal interference is generated between the terminal and the another terminal and identifier information used to determine the another terminal that sends the sounding signal, so that the first station performs scheduling processing on the terminal and the another terminal according to the signal parameter value and the identifier information.

The terminal is specifically a terminal that is also in the first service set in which the another terminal and the first station are; or the terminal is specifically a terminal that is in the second service set, where the second service set is a service set neighboring to the first service set.

The application program stored in the memory 1130 further includes an instruction that can be used to enable the processor 1120 to perform the following processes:

if the terminal is in the first service set, receiving a listening message sent by the first station, where the listening message is used to instruct the terminal to listen to the sounding signal; or if the terminal is in the second service set, receiving a listening message sent by a second station, where the listening message is used to instruct the terminal to listen to the sounding signal.

The application program stored in the memory 1130 further includes an instruction that can be used to enable the processor 1120 to perform the following processes:

if the terminal is in the first service set, receiving a first scheduling message sent by the first station, where the first scheduling message includes identifier information of a first time-frequency resource block; and sending an uplink/downlink signal on the first time-frequency resource block; or if the terminal is in the first service set, receiving a first scheduling message sent by the first station, where the first scheduling message includes identifier information of a second time-frequency resource block; and if the another terminal sends an uplink/downlink signal on a first time-frequency resource block, sending, by the terminal, a downlink/uplink signal on the second time-frequency resource block.

The application program stored in the memory 1130 further includes an instruction that can be used to enable the processor 1120 to perform the following processes:

if the terminal is in the second service set, receiving first scheduling information sent by the second station, where the first scheduling information includes identifier information of a first video resource block; and sending the uplink/downlink signal on the first time-frequency resource block;

or if the terminal is in the second service set, receiving a first scheduling message sent by the second station, where the first scheduling message includes identifier information of a second time-frequency resource block; and if the another terminal sends the uplink/downlink signal on a first time-frequency resource block, sending a downlink/uplink signal on the second time-frequency resource block.

Therefore, according to the terminal provided in this embodiment of the present invention, the terminal listens to a sounding signal sent by another terminal, if the terminal obtains the sounding signal by means of listening, the terminal sends mutual interference information to a first station, and the first station performs scheduling processing on the terminal and the another terminal according to a signal parameter value and identifier information that are included in the mutual interference information, where the identifier information is used to determine the terminal that sends the sounding signal, thereby avoiding a problem that mutual interference exists between terminal devices in an existing communications system, causing a reduction in communication efficiency and communication quality of the communications system. This embodiment of the present invention proposes the solution to the problem that mutual interference exists between terminal devices, so that impact of mutual interference between terminal devices that perform communication can be reduced, thereby improving communication efficiency and communication quality of a communications system.

A person skilled in the art may be further aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

Steps of methods or algorithms described in the embodiments disclosed in this specification may be implemented by hardware, a software module executed by a processor, or a combination thereof. The software module may reside in a random access memory (RAM), a memory, a read-only memory (ROM), an electrically programmable ROM, an electrically erasable programmable ROM, a register, a hard disk, a removable disk, a CD-ROM, or any other form of storage medium known in the art.

In the foregoing specific implementation manners, the objective, technical solutions, and benefits of the present invention are further described in detail. It should be understood that the foregoing descriptions are merely specific implementation manners of the present invention, but are not intended to limit the protection scope of the present invention. Any modification, equivalent replacement, or improvement made without departing from the spirit and principle of the present invention should fall within the protection scope of the present invention.

What is claimed is:

1. A terminal scheduling method, wherein the method comprises:
    sending, by a first station, a first notification message to a first terminal that is also in a first service set, wherein the first notification message is used to instruct the first terminal to send a sounding signal;
    receiving, by the first station, mutual interference information sent by a second terminal, wherein the mutual interference information comprises a signal parameter value used to represent that signal interference is generated between the second terminal and the first terminal and identifier information used to determine the first terminal that sends the sounding signal, and the mutual interference information is sent if the second terminal obtains the sounding signal by means of listening; and
    performing, by the first station, scheduling processing on the first terminal and the second terminal according to the signal parameter value and the identifier information.

2. The terminal scheduling method according to claim 1, wherein the first notification message comprises identifier information of an in-band/out-of-band time-frequency resource block used to send the sounding signal, so that the first terminal sends the sounding signal on the in-band/out-of-band time-frequency resource block.

3. The terminal scheduling method according to claim 2, wherein the second terminal is specifically a terminal in the first service set; or
    the second terminal is specifically a terminal in a second service set, wherein the second service set is a service set neighboring to the first service set; and
    after the sending, by a first station, a first notification message to a first terminal that is also in a first service set, the method further comprises:
    if the second terminal is in the first service set, sending, by the first station, a listening message to the specified second terminal, wherein the listening message is used to instruct the second terminal to listen to the sounding signal; or
    if the second terminal is in the second service set, sending, by the first station, a second notification message to a second station in the second service set, wherein the second notification message is used by the second station to send a listening message to the specified second terminal, and the listening message is used to instruct the second terminal to listen to the sounding signal.

4. The terminal scheduling method according to claim 3, wherein if the first terminal sends the sounding signal on the out-of-band time-frequency resource block, the sounding signal comprises identifier information of a communications module in the first terminal; and
    the receiving, by the first station, mutual interference information sent by a second terminal, wherein the mutual interference information comprises a signal parameter value used to represent that signal interference is generated between the second terminal and the first terminal and identifier information used to determine the first terminal that sends the sounding signal specifically comprises:
    if the first terminal sends the sounding signal on the in-band time-frequency resource block, and the second terminal is in the first service set and obtains the sounding signal by means of listening, receiving, by the first station, the mutual interference information sent by the second terminal, wherein the mutual interference information comprises the signal parameter value and the identifier information of the in-band time-frequency resource block; or
    if the first terminal sends the sounding signal on the out-of-band time-frequency resource block, and the second terminal is in the first service set and obtains the sounding signal by means of listening, receiving, by the first station, the mutual interference information sent by the second terminal, wherein the mutual interference information comprises the signal parameter value and the identifier information of the communications module; or
    if the first terminal sends the sounding signal on the in-band/out-of-band time-frequency resource block, and the second terminal is in the second service set and obtains the sounding signal by means of listening, receiving, by the first station, the mutual interference information that is sent by the second terminal by using the second station, wherein the mutual interference information comprises the signal parameter value and the identifier information of the in-band time-frequency resource block/the identifier information of the communications module.

5. The terminal scheduling method according to claim 4, wherein the performing, by the first station, scheduling processing on the first terminal and the second terminal according to the signal parameter value and the identifier information specifically comprises:

updating, by the first station, a terminal mutual interference list according to the signal parameter value and the identifier information of the in-band time-frequency resource block/the identifier information of the communications module; and performing, by the first station, scheduling processing on the first terminal and the second terminal by using the terminal mutual interference list.

6. The terminal scheduling method according to claim 5, wherein the performing, by the first station, scheduling processing on the first terminal and the second terminal by using the terminal mutual interference list specifically comprises:

if the second terminal is in the first service set, scheduling, by the first station, either terminal of the first terminal and the second terminal to send an uplink/downlink signal on a first time-frequency resource block;

if the first terminal sends the uplink/downlink signal on the first time-frequency resource block, obtaining, by the first station from the terminal mutual interference list, identifier information of the second terminal whose signal parameter value does not exceed an interference threshold; and sending, by the first station, a first scheduling message to the second terminal according to the identifier information of the second terminal, wherein the first scheduling message is used to instruct the second terminal to send a downlink/uplink signal on the first time-frequency resource block; or if the second terminal sends the uplink/downlink signal on the first time-frequency resource block, obtaining, by the first station from the terminal mutual interference list, identifier information of the first terminal whose signal parameter value does not exceed an interference threshold; and sending, by the first station, a first scheduling message to the first terminal according to the identifier information of the first terminal, wherein the first scheduling message is used to instruct the first terminal to send a downlink/uplink signal on the first time-frequency resource block.

7. The terminal scheduling method according to claim 5, wherein the performing, by the first station, scheduling processing on the first terminal and the second terminal by using the terminal mutual interference list specifically comprises:

if the second terminal is in the first service set, scheduling, by the first station, either terminal of the first terminal and the second terminal to send an uplink/downlink signal on a first time-frequency resource block;

if the first terminal sends the uplink/downlink signal on the first time-frequency resource block, obtaining, by the first station from the terminal mutual interference list, identifier information of the second terminal whose signal parameter value exceeds the interference threshold; and sending, by the first station, a second scheduling message to the second terminal according to the identifier information of the second terminal, wherein the second scheduling message comprises identifier information of a second time-frequency resource block, and the second scheduling message is used to instruct the second terminal to send a downlink/uplink signal on the second time-frequency resource block; or if the second terminal sends the uplink/downlink signal on the first time-frequency resource block, obtaining, by the first station from the terminal mutual interference list, identifier information of the first terminal whose signal parameter value exceeds the interference threshold; and sending, by the first station, a second scheduling message to the first terminal according to the identifier information of the first terminal, wherein the second scheduling message comprises identifier information of a second time-frequency resource block, and the second scheduling message is used to instruct the first terminal to send a downlink/uplink signal on the second time-frequency resource block.

8. The terminal scheduling method according to claim 5, wherein the performing, by the first station, scheduling processing on the first terminal and the second terminal by using the terminal mutual interference list specifically comprises:

if the second terminal is in the first service set, obtaining, by the first station from the terminal mutual interference list, identifier information of the first terminal and the second terminal whose signal parameter values both fail to exceed an interference threshold; and respectively sending, by the first station, a third scheduling message to the first terminal and the second terminal according to the identifier information of the first terminal and the second terminal, wherein the third scheduling message comprises identifier information of an first time-frequency resource block, and the third scheduling message is used to instruct the first terminal and the second terminal to respectively send an uplink/downlink signal on the first time-frequency resource block; or if the second terminal is in the first service set, obtaining, by the first station from the terminal mutual interference list, identifier information of the first terminal and the second terminal whose signal parameter values both exceed an interference threshold; and respectively sending, by the first station, a fourth scheduling message to the first terminal and the second terminal according to the identifier information of the first terminal and the second terminal, wherein the fourth scheduling message comprises identifier information of a first time-frequency resource block and a second time-frequency resource block, and the fourth scheduling message is used to instruct the first terminal and the second terminal to respectively send an uplink/downlink signal on the first time-frequency resource block and the second time-frequency resource block.

9. The terminal scheduling method according to claim 5, wherein the performing, by the first station, scheduling processing on the first terminal and the second terminal by using the terminal mutual interference list specifically comprises:

if the second terminal is in the second service set, obtaining, by the first station from the terminal mutual interference list, identifier information of the first terminal and the second terminal whose signal parameter values both fail to exceed an interference threshold;

sending, by the first station, a fifth scheduling message to the first terminal according to the identifier information of the first terminal, wherein the fifth scheduling message comprises identifier information of a first time-frequency resource block, and the fifth scheduling message is used to instruct the first terminal to send an uplink/downlink signal on the first time-frequency resource block; and sending, by the first station, a third notification message to the second station, wherein the third notification message comprises identifier information of the second terminal and the identifier information of the first time-frequency resource block, and the third notification message is used by the second station to instruct the second terminal to send a downlink/uplink signal on the first time-frequency resource block.

10. The terminal scheduling method according to claim 5, wherein the performing, by the first station, scheduling processing on the first terminal and the second terminal by using the terminal mutual interference list specifically comprises:

if the second terminal is in the second service set, obtaining, by the first station from the terminal mutual interference list, identifier information of the first terminal and the second terminal whose signal parameter values both exceed an interference threshold;

sending, by the first station, a sixth scheduling message to the first terminal according to the identifier information of the first terminal, wherein the sixth scheduling message comprises identifier information of a first time-frequency resource block, and the sixth scheduling instruction is used to instruct the first terminal to send an uplink/downlink signal on the first time-frequency resource block; and sending, by the first station, a fourth notification message to the second station, wherein the fourth notification message comprises identifier information of the second terminal and identifier information of a second time-frequency resource block, and the fourth notification message is used by the second station to instruct the second terminal to send a downlink/uplink signal on the second time-frequency resource block.

11. A terminal scheduling method, wherein the method comprises:

receiving, by a first terminal, a first notification message sent by a station that is in a same service set, wherein the first notification message is used to instruct the first terminal to send a sounding signal; and sending, by the first terminal, the sounding signal according to the first notification message, so that if a second terminal obtains the sounding signal by means of listening and sends mutual interference information to the station, the station performs scheduling processing on the first terminal and the second terminal according to a signal parameter value and identifier information that are comprised in the mutual interference information, wherein the signal parameter value is used to represent that signal interference is generated between the second terminal and the first terminal, and the identifier information is used to determine the first terminal that sends the sounding signal.

12. The terminal scheduling method according to claim 11, wherein the first notification message comprises identifier information of an in-band/out-of-band time-frequency resource block used to send the sounding signal, so that the first terminal sends the sounding signal on the in-band/out-of-band time-frequency resource block.

13. The terminal scheduling method according to claim 11, wherein the method further comprises:

receiving a first scheduling message sent by the station, wherein the first scheduling message comprises identifier information of a first time-frequency resource block; and sending, by the first terminal, an uplink/downlink signal on the first time-frequency resource block;

or receiving a first scheduling message sent by the station, wherein the first scheduling message comprises identifier information of a second time-frequency resource block; and if the second terminal sends an uplink/downlink signal on the first time-frequency resource block, sending, by the first terminal, a downlink/uplink signal on the second time-frequency resource block.

14. A terminal scheduling method, wherein the method comprises:

listening to, by a first terminal, a sounding signal sent by a second terminal; and if the first terminal obtains the sounding signal by means of listening, sending, by the first terminal, mutual interference information to a first station, wherein the mutual interference information comprises a signal parameter value used to represent that signal interference is generated between the first terminal and the second terminal and identifier information used to determine the second terminal that sends the sounding signal, so that the first station performs scheduling processing on the first terminal and the second terminal according to the signal parameter value and the identifier information.

15. The terminal scheduling method according to claim 14, wherein the first terminal is specifically a terminal that is also in a first service set in which the second terminal and the first station are; or the first terminal is specifically a terminal in a second service set, wherein the second service set is a service set neighboring to the first service set; and before the listening to, by a first terminal, a sounding signal sent by a second terminal, the method further comprises:

if the first terminal is in the first service set, receiving, by the first terminal, a listening message sent by the first station, wherein the listening message is used to instruct the first terminal to listen to the sounding signal; or if the first terminal is in the second service set, receiving, by the first terminal, a listening message sent by a second station, wherein the listening message is used to instruct the first terminal to listen to the sounding signal.

16. The terminal scheduling method according to claim 14, wherein the method further comprises:

if the first terminal is in a first service set, receiving, by the first terminal, a first scheduling message sent by the first station, wherein the first scheduling message comprises identifier information of a first time-frequency resource block; and sending, by the first terminal, an uplink/downlink signal on the first time-frequency resource block;

or if the first terminal is in a first service set, receiving, by the first terminal, a first scheduling message sent by the first station, wherein the first scheduling message comprises identifier information of a second time-frequency resource block; and if the second terminal sends an uplink/downlink signal on the first time-frequency resource block, sending, by the first terminal, a downlink/uplink signal on the second time-frequency resource block.

17. The terminal scheduling method according to claim 15, wherein the method further comprises:
if the first terminal is in the second service set, receiving, by the first terminal, first scheduling information sent by the second station, wherein the first scheduling information comprises identifier information of a first time-frequency resource block;
sending, by the first terminal, an uplink/downlink signal on the first time-frequency resource block;
or
if the first terminal is in the second service set, receiving, by the first terminal, a first scheduling message sent by the second station, wherein the first scheduling message comprises identifier information of a second time-frequency resource block;
if the second terminal sends an uplink/downlink signal on the first time-frequency resource block, sending, by the first terminal, a downlink/uplink signal on the second time-frequency resource block.

18. A station, wherein the station is in a first service set, and the station comprises:
a network interface;
a processor; and
a memory, wherein
the network interface is configured to perform interactive communication with a first terminal that is also in the first service set and a first station in a second service set, wherein the second service set is a service set neighboring to the first service set; and
the memory is configured to store an application program, wherein the application program comprises an instruction that can be used to enable the processor to perform the following processes:
sending a first notification message to the first terminal, wherein the first notification message is used to instruct the first terminal to send a sounding signal;
receiving mutual interference information sent by a second terminal, wherein the mutual interference information comprises a signal parameter value used to represent that signal interference is generated between the second terminal and the first terminal and identifier information used to determine the first terminal that sends the sounding signal, and the mutual interference information is sent if the second terminal obtains the sounding signal by means of listening; and
performing scheduling processing on the first terminal and the second terminal according to the signal parameter value and the identifier information.

19. The station according to claim 18, wherein the first notification message sent by the network interface comprises identifier information of an in-band/out-of-band time-frequency resource block used to send the sounding signal, so that the first terminal sends the sounding signal on the in-band/out-of-band time-frequency resource block.

20. The station according to claim 19, wherein the second terminal is specifically a terminal in the first service set; or
the second terminal is specifically a terminal in the second service set, wherein the second service set is a service set neighboring to the first service set; and
the application program stored in the memory further comprises an instruction that can be used to enable the processor to perform the following processes:

if the second terminal is in the first service set, sending a listening message to the specified second terminal, wherein the listening message is used to instruct the second terminal to listen to the sounding signal; or
if the second terminal is in the second service set, sending a second notification message to the first station in the second service set, wherein the second notification message is used by the first station in the second service set to send a listening message to the specified second terminal, wherein the listening message is used to instruct the second terminal to listen to the sounding signal.

21. The station according to claim 20, wherein if the first terminal sends the sounding signal on the out-of-band time-frequency resource block, the sounding signal comprises identifier information of a communications module in the first terminal; and
the instruction that is included in the application program stored in the memory and that can be used to enable the processor to perform the process of receiving mutual interference information sent by a second terminal, wherein the mutual interference information comprises a signal parameter value used to represent that signal interference is generated between the second terminal and the first terminal and identifier information used to determine the first terminal that sends the sounding signal is specifically an instruction for performing the following process:
if the first terminal sends the sounding signal on the in-band time-frequency resource block, and the second terminal is in the first service set and obtains the sounding signal by means of listening, receiving the mutual interference information sent by the second terminal, wherein the mutual interference information comprises the signal parameter value and the identifier information of the in-band time-frequency resource block; or
if the first terminal sends the sounding signal on the out-of-band time-frequency resource block, and the second terminal is in the first service set and obtains the sounding signal by means of listening, receiving the mutual interference information sent by the second terminal, wherein the mutual interference information comprises the signal parameter value and the identifier information of the communications module; or
if the first terminal sends the sounding signal on the in-band/out-of-band time-frequency resource block, and the second terminal is in the second service set and obtains the sounding signal by means of listening, receiving the mutual interference information that is sent by the second terminal by using a second station, wherein the mutual interference information comprises the signal parameter value and the identifier information of the in-band time-frequency resource block/the identifier information of the communications module.

22. The station according to claim 21, wherein the instruction that is of the application program stored in the memory and that can be used to enable the processor to perform the process of performing scheduling processing on the first terminal and the second terminal according to the signal parameter value and the identifier information is specifically an instruction for performing the following processes:
updating a terminal mutual interference list according to the signal parameter value and the identifier information of the in-band time-frequency resource block/the identifier information of the communications module; and performing scheduling processing on the first terminal and the second terminal by using the terminal mutual interference list.

23. The station according to claim 22, wherein the instruction that is of the application program stored in the memory and that can be used to enable the processor to perform the process of performing scheduling processing on the first terminal and the second terminal by using the terminal mutual interference list is specifically an instruction for performing the following processes:

if the second terminal is in the first service set, scheduling either terminal of the first terminal and the second terminal to send an uplink/downlink signal on a first time-frequency resource block;

if the first terminal sends the uplink/downlink signal on the first time-frequency resource block, obtaining, from the terminal mutual interference list, identifier information of the second terminal whose signal parameter value does not exceed an interference threshold; and sending a first scheduling message to the second terminal according to the identifier information of the second terminal, wherein the first scheduling message is used to instruct the second terminal to send a downlink/uplink signal on the first time-frequency resource block;

or if the second terminal sends the uplink/downlink signal on the first time-frequency resource block, obtaining, from the terminal mutual interference list, identifier information of the first terminal whose signal parameter value does not exceed an interference threshold; and sending a first scheduling message to the first terminal according to the identifier information of the first terminal, wherein the first scheduling message is used to instruct the first terminal to send a downlink/uplink signal on the first time-frequency resource block.

24. The station according to claim 23, wherein the instruction that is of the application program stored in the memory and that can be used to enable the processor to perform the process of performing scheduling processing on the first terminal and the second terminal by using the terminal mutual interference list is specifically an instruction for performing the following processes:

if the second terminal is in the first service set, scheduling, by the first station, either terminal of the first terminal and the second terminal to send the uplink/downlink signal on the first time-frequency resource block;

if the first terminal sends the uplink/downlink signal on the first time-frequency resource block, obtaining, by the first station from the terminal mutual interference list, identifier information of the second terminal whose signal parameter value exceeds the interference threshold; and sending a second scheduling message to the second terminal according to the identifier information of the second terminal, wherein the second scheduling message comprises identifier information of a second time-frequency resource block, and the second scheduling message is used to instruct the second terminal to send a downlink/uplink signal on the second time-frequency resource block; or if the second terminal sends the uplink/downlink signal on the first time-frequency resource block, obtaining, from the terminal mutual interference list, identifier information of the first terminal whose signal parameter value exceeds the interference threshold; and sending, by the first station, a second scheduling message to the first terminal according to the identifier information of the first terminal, wherein the second scheduling message comprises identifier information of a second time-frequency resource block, and the second scheduling message is used to instruct the first terminal to send a downlink/uplink signal on the second time-frequency resource block.

25. The station according to claim 22, wherein the instruction that is of the application program stored in the memory and that can be used to enable the processor to perform the process of performing scheduling processing on the first terminal and the second terminal by using the terminal mutual interference list is specifically an instruction for performing the following processes:

if the second terminal is in the first service set, obtaining, from the terminal mutual interference list, identifier information of the first terminal and the second terminal whose signal parameter values both fail to exceed an interference threshold; and respectively sending a third scheduling message to the first terminal and the second terminal according to the identifier information of the first terminal and the second terminal, wherein the third scheduling message comprises identifier information of the first time-frequency resource block, and the third scheduling message is used to instruct the first terminal and the second terminal to respectively send an uplink/downlink signal on the first time-frequency resource block; or if the second terminal is in the first service set, obtaining, from the terminal mutual interference list, identifier information of the first terminal and the second terminal whose signal parameter values both exceed an interference threshold; and respectively sending a fourth scheduling message to the first terminal and the second terminal according to the identifier information of the first terminal and the second terminal, wherein the fourth scheduling message comprises identifier information of the first time-frequency resource block and the second time-frequency resource block, and the fourth scheduling message is used to instruct the first terminal and the second terminal to respectively send an uplink/downlink signal on the first time-frequency resource block and the second time-frequency resource block.

26. The station according to claim 22, wherein the instruction that is of the application program stored in the memory and that can be used to enable the processor to perform the process of performing scheduling processing on the first terminal and the second terminal by using the terminal mutual interference list is specifically an instruction for performing the following processes:

if the second terminal is in the second service set, obtaining, from the terminal mutual interference list, identifier information of the first terminal and the second terminal whose signal parameter values both fail to exceed an interference threshold;

sending a fifth scheduling message to the first terminal according to the identifier information of the first terminal, wherein the fifth scheduling message comprises identifier information of a first time-frequency resource block, and the fifth scheduling instruction is used to instruct the first terminal to send an uplink/downlink signal on the first time-frequency resource block; and sending a third notification message to the first station in the second service set, wherein the third notification message comprises the identifier information of the second terminal and the identifier information of the first time-frequency resource block, and the third notification message is used by the first station in the second service set to instruct the second terminal to send a downlink/uplink signal on the first time-frequency resource block.

27. The station according to claim 22, wherein the instruction that is of the application program stored in the memory and that can be used to enable the processor to perform the process of performing scheduling processing on the first terminal and the second terminal by using the terminal mutual interference list is specifically an instruction for performing the following processes:
if the second terminal is in the second service set, obtaining, from the terminal mutual interference list, identifier information of the first terminal and the second terminal whose signal parameter values both exceed an interference threshold;
sending a sixth scheduling message to the first terminal according to the identifier information of the first terminal, wherein the sixth scheduling message comprises identifier information of a first time-frequency resource block, and the sixth scheduling instruction is used to instruct the first terminal to send an uplink/downlink signal on the first time-frequency resource block;
sending a fourth notification message to the first station in the second service set, wherein the fourth notification message comprises the identifier information of the second terminal and identifier information of a second time-frequency resource block, and the fourth notification message is used by the first station in the second service set to instruct the second terminal to send a downlink/uplink signal on the second time-frequency resource block.

28. A terminal, wherein the terminal comprises:
a network interface;
a processor; and
a memory, wherein
the network interface is configured to perform interactive communication with a station that is in a same service set; and
the memory is configured to store an application program, wherein the application program comprises an instruction that can be used to enable the processor to perform the following processes:
receiving a first notification message sent by a station that is in a same service set, wherein the first notification message is used to instruct the terminal to send a sounding signal; and
sending the sounding signal according to the first notification message, so that if another terminal obtains the sounding signal by means of listening and sends mutual interference information to the station, the station performs scheduling processing on the terminal and the another terminal according to a signal parameter value and identifier information that are comprised in the mutual interference information, wherein the signal parameter value is used to represent that signal interference is generated between the terminal and the another terminal, and the identifier information is used to determine the another terminal that sends the sounding signal.

29. The terminal according to claim 28, wherein the first notification message comprises identifier information of an in-band/out-of-band time-frequency resource block used to send the sounding signal, so that the terminal sends the sounding signal on the in-band/out-of-band time-frequency resource block.

30. The terminal according to claim 28, wherein the application program stored in the memory further comprises an instruction that can be used to enable the processor to perform the following processes:
receiving a first scheduling message sent by the station, wherein the first scheduling message comprises identifier information of a first time-frequency resource block; and
sending an uplink/downlink signal on the first time-frequency resource block; or
receiving a first scheduling message sent by the station, wherein the first scheduling message comprises identifier information of a second time-frequency resource block; and
if the another terminal sends an uplink/downlink signal on the first time-frequency resource block, sending a downlink/uplink signal on the second time-frequency resource block.

31. A terminal, wherein the terminal comprises:
a network interface;
a processor; and
a memory, wherein
the network interface is configured to perform interactive communication with a first terminal that is also in a first service set and a first station in a second service set, wherein the second service set is a service set neighboring to the first service set; and
the memory is configured to store an application program, wherein the application program comprises an instruction that can be used to enable the processor to perform the following processes:
listening to a sounding signal sent by another terminal; and
if the terminal obtains the sounding signal by means of listening, sending mutual interference information to the first station, wherein the mutual interference information comprises a signal parameter value used to represent that signal interference is generated between the terminal and the another terminal and identifier information used to determine the another terminal that sends the sounding signal, so that the first station performs scheduling processing on the terminal and the another terminal according to the signal parameter value and the identifier information.

32. The terminal according to claim 31, wherein the terminal is specifically a terminal that is also in the first service set in which the another terminal and the first station are; or
the terminal is specifically a terminal that is in the second service set, and the second service set is a service set neighboring to the first service set; and
the application program stored in the memory further comprises an instruction that can be used to enable the processor to perform the following processes:
if the terminal is in the first service set, receiving a listening message sent by the first station, wherein the listening message is used to instruct the terminal to listen to the sounding signal; or
if the terminal is in the second service set, receiving a listening message sent by a second station, wherein the listening message is used to instruct the terminal to listen to the sounding signal.

33. The terminal according to claim 31, wherein the application program stored in the memory further comprises an instruction that can be used to enable the processor to perform the following processes:

if the terminal is in the first service set, receiving a first scheduling message sent by the first station, wherein the first scheduling message comprises identifier information of a first time-frequency resource block; and sending an uplink/downlink signal on the first time-frequency resource block; or if the terminal is in the first service set, receiving a first scheduling message sent by the first station, wherein the first scheduling message comprises identifier information of a second time-frequency resource block; and if the another terminal sends an uplink/downlink signal on the first time-frequency resource block, sending, by the terminal, a downlink/uplink signal on the second time-frequency resource block.

34. The terminal according to claim 31, wherein the application program stored in the memory further comprises an instruction that can be used to enable the processor to perform the following processes:

if the terminal is in the second service set, receiving first scheduling information sent by a second station, wherein the first scheduling information comprises identifier information of a first video resource block; and sending an uplink/downlink signal on the first time-frequency resource block; or if the terminal is in the second service set, receiving a first scheduling message sent by the second station, wherein the first scheduling message comprises identifier information of a second time-frequency resource block; and if the another terminal sends an uplink/downlink signal on the first time-frequency resource block, sending a downlink/uplink signal on the second time-frequency resource block.

* * * * *